US012671538B2

(12) United States Patent
Tian et al.

(10) Patent No.: US 12,671,538 B2
(45) Date of Patent: Jun. 30, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Jiejiao Tian, Dongguan (CN); Wenhong Chen, Dongguan (CN); Zhihua Shi, Dongguan (CN); Yingpei Huang, Dongguan (CN); Yun Fang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 333 days.

(21) Appl. No.: 18/447,878

(22) Filed: Aug. 10, 2023

(65) Prior Publication Data

US 2023/0388075 A1     Nov. 30, 2023

Related U.S. Application Data

(63) Continuation of application No. PCT/CN2021/085081, filed on Apr. 1, 2021.

(51) Int. Cl.
*H04L 5/00*            (2006.01)

(52) U.S. Cl.
CPC .......... *H04L 5/0048* (2013.01); *H04L 5/0007* (2013.01)

(58) Field of Classification Search
CPC ... H04L 5/0048; H04L 5/0007; H04L 5/0012; H04L 5/00; H04L 5/0051; H04L 5/0094
See application file for complete search history.

(56) References Cited

U.S. PATENT DOCUMENTS

2019/0357215 A1     11/2019   Zhou et al.

FOREIGN PATENT DOCUMENTS

CN       101394263 A        3/2009
CN       111277389 A  *   6/2020   ............ H04W 72/23
(Continued)

OTHER PUBLICATIONS

3GPP TSG RAN WG1 Meeting #104-e, FL Summary #2 on SRS Enhancements (Year: 2021).*
(Continued)

*Primary Examiner* — Khaled M Kassim
*Assistant Examiner* — Noah James Sugden
(74) *Attorney, Agent, or Firm* — Sheppard, Mullin, Richter & Hampton LLP

(57)            ABSTRACT

The present disclosure provides a wireless communication method, a terminal device, and a network device. The method includes: determining, by a terminal device based on a frequency-domain related parameter and a first correspondence, an initial number of RBs for transmitting an SRS on each OFDM symbol in consecutive OFDM symbols, the first correspondence being a correspondence between frequency-domain related parameters and initial numbers of RBs; determining, by the terminal device based on the initial number of RBs and the frequency-domain related parameter, first consecutive RBs for transmitting the SRS; and adjusting, by the terminal device based on an adjustment factor, the initial number of RBs to obtain an actual number of RBs smaller than the initial number of RBs, and determining, by the terminal device based on position information, a position of second consecutive RBs for transmitting the SRS in the first consecutive RBs on each OFDM symbol.

16 Claims, 10 Drawing Sheets

(56) References Cited

FOREIGN PATENT DOCUMENTS

| | | | |
|---|---|---|---|
| CN | 111278130 A | 6/2020 | |
| WO | WO-2019096244 A1 * | 5/2019 | ......... H04L 27/2613 |

OTHER PUBLICATIONS

3GPP TS 38.211 V16.5.0 NR; Physical Channels and Modulation (Release 16) (Year: 2021).*

Machine Translation of CN 111277389 A (Year: 2020).*

Machine Translation of WO 2019096244 A1 (Year: 2018).*

International Search Report and Written Opinion dated Dec. 23, 2021 in International Application No. PCT/CN2021/085081. English translation attached.

Qualcomm Incorporated, "Discussion on SRS enhancement" 3GPP TSG-RAN WG1 Meeting #104-e R1-2101451, Jan. 2021 (Jan. 25, 2021), 42 pages.

"3rd Generation Partnership Project; Technical Specification Group Radio Access Network;NR;Physical layer procedures for data(Release 15)," 3GPP TS 38.214 V15.8.0, Dec. 2019 (Dec. 2019), Section 6.2.1, 105 pages.

"3rd Generation Partnership Project; Technical Specification Group Radio Access Network;NR;Physical channels and modulation(Release 15)"3GPP TS 38.211 V15.8.0, Dec. 2019 (Dec. 2019), Section 6.4.1.4, 93 pages.

"3rd Generation Partnership Project; Technical Specification Group Radio Access Network;NR;Multiplexing and channel coding(Release 15)," 3GPP TS 38.212 V15.8.0, Dec. 2019 (Dec. 2019), Section 7.3.1, 98 pages.

ZTE, "FL summary #2 on SRS enhancements"3GPP TSG RAN WG1 Meeting #104-e R1-2101914, Jan. 2021 (Jan. 2021), Sections 4-5, 10 pages.

ZTE, FL summary #1 on SRS enhancements'3GPPTSG RAN WGI Meeting #104-e RI-2101783, Jan. 2021 (Jan. 2021), Sections 5-6, 49 pages.

Extended European Search Report dated Apr. 10, 2024 received in European Patent Application No. EP21934024.7.

"3rd Generation Partnership Project; Technical Specification Group Radio Access Network; NR; Physical channels and modulation(Release 16)",3GPP DRAFT;Mar. 30, 2021,XP051991249.

Moderator (ZTE):"FL summary #2 on SRS enhancements"3GPP Draft: R1-2101914.Feb. 2, 2021.XP051975993.

Office Action issued by the European Patent Office for Application No. 21934024.7 mailed on Nov. 7, 2025.

* cited by examiner

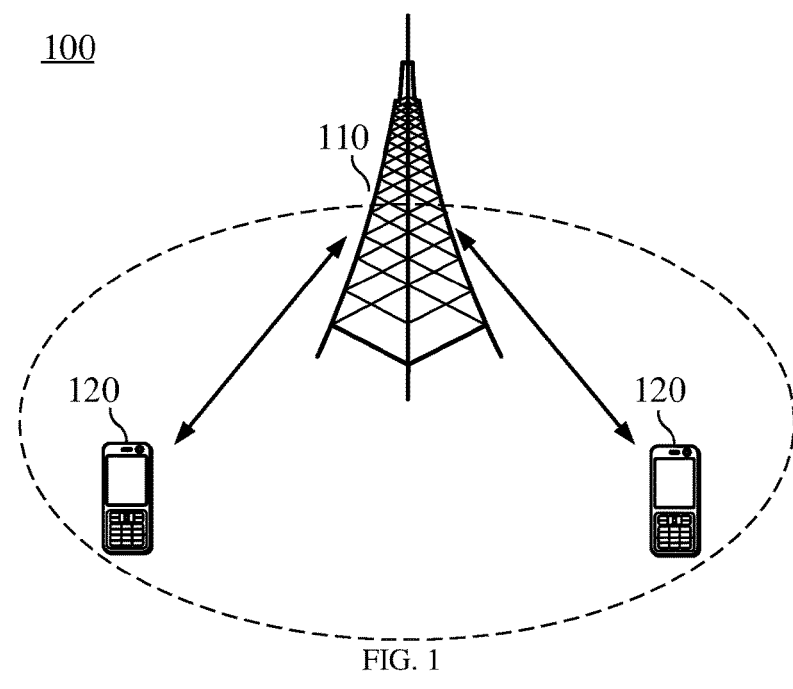
FIG. 1
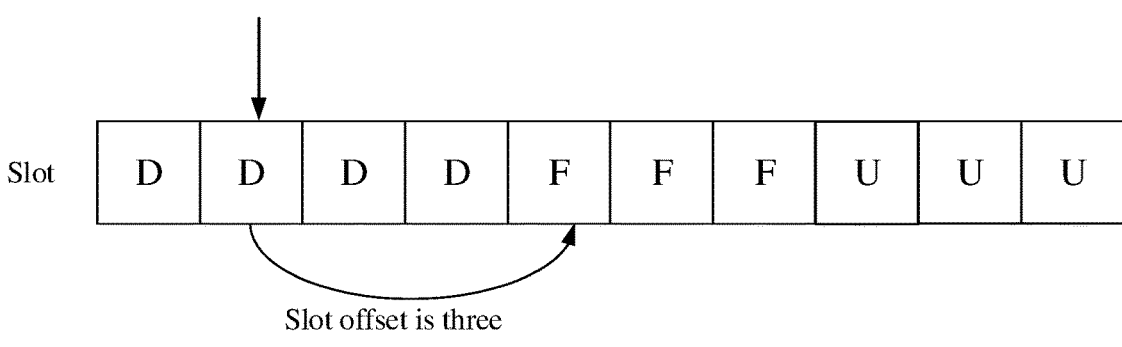
FIG. 2
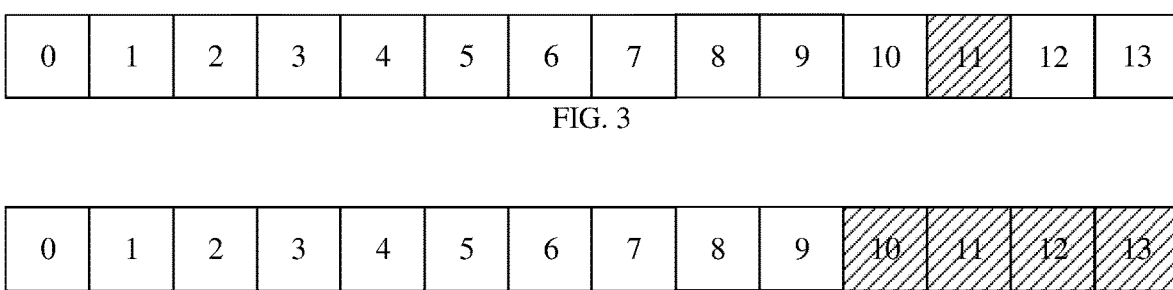
FIG. 3
FIG. 4

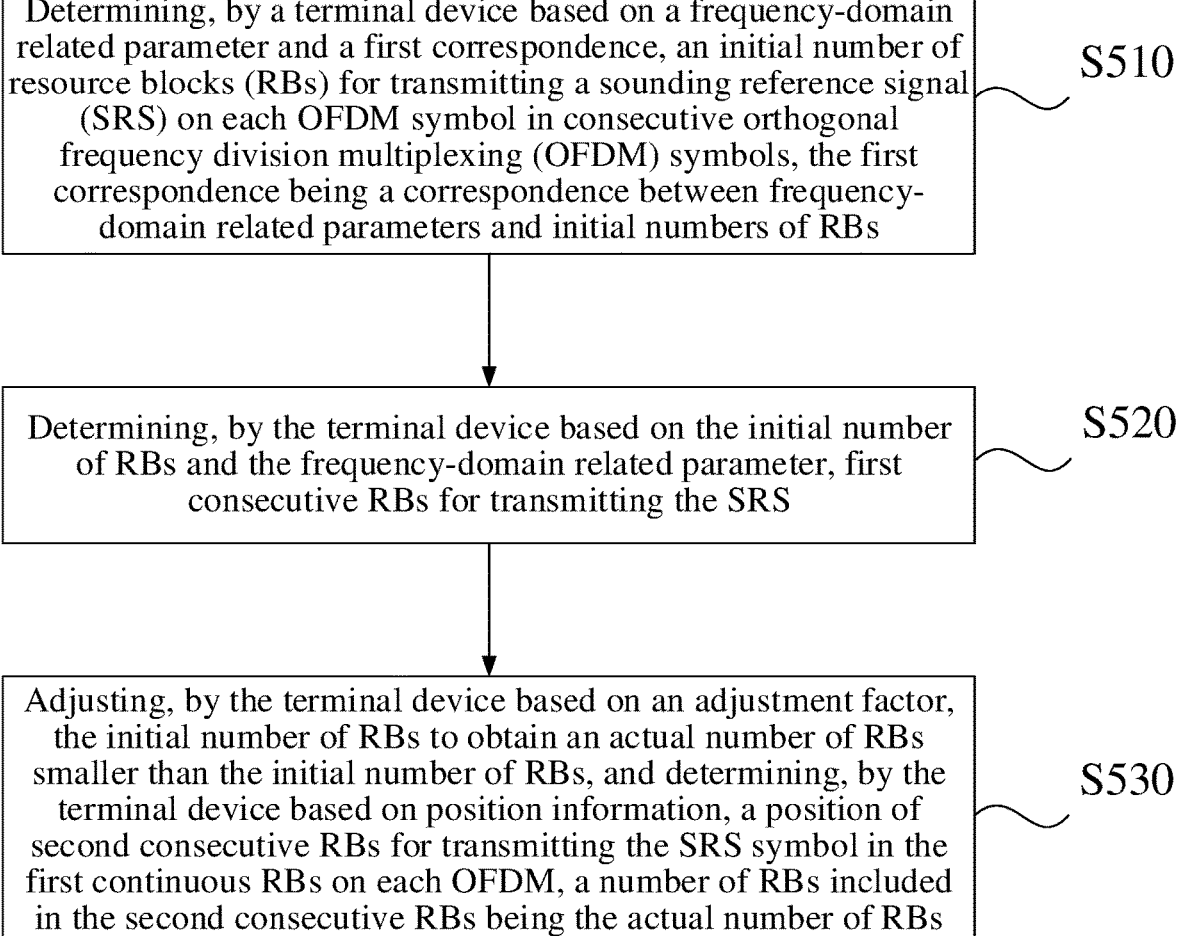

Determining, by a terminal device based on a frequency-domain related parameter and a first correspondence, an initial number of resource blocks (RBs) for transmitting a sounding reference signal (SRS) on each OFDM symbol in consecutive orthogonal frequency division multiplexing (OFDM) symbols, the first correspondence being a correspondence between frequency-domain related parameters and initial numbers of RBs

S510

Determining, by the terminal device based on the initial number of RBs and the frequency-domain related parameter, first consecutive RBs for transmitting the SRS

S520

Adjusting, by the terminal device based on an adjustment factor, the initial number of RBs to obtain an actual number of RBs smaller than the initial number of RBs, and determining, by the terminal device based on position information, a position of second consecutive RBs for transmitting the SRS symbol in the first continuous RBs on each OFDM, a number of RBs included in the second consecutive RBs being the actual number of RBs

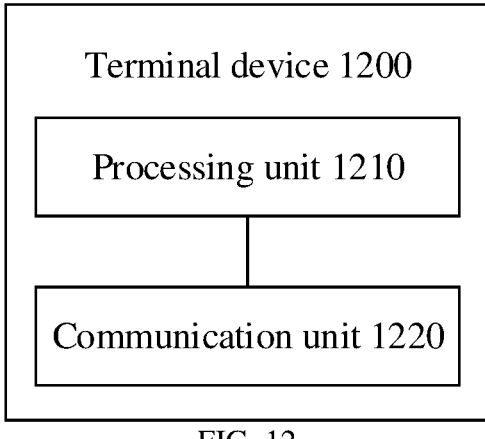
FIG. 12
Network device 1300
Communication unit 1310
FIG. 13
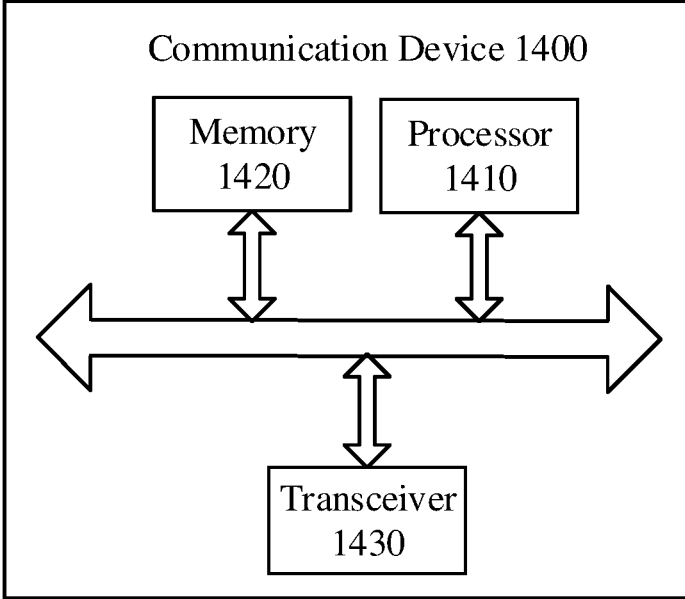
FIG. 14

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2021/085081 filed on Apr. 1, 2021, the entire contents of which are incorporated herein by reference.

FIELD

Embodiments of the present disclosure relate to the communication field, and more particularly, to a wireless communication method, a terminal device, and a network device.

BACKGROUND

A Sounding reference signal (SRS) is an important reference signal in a new radio (NR) system. At present, frequency-domain configuration of the SRS is determined by frequency-domain related parameters $C_{SRS}$ and $B_{SRS}$ in Table 6.4.1.4.3-1 of Specification 38.211. A number $m_{SRS,b}$ of consecutive resource blocks (RBs) for transmitting the SRS may be determined by the two frequency-domain related parameters, where $b=B_{SRS}$. Based on this, $m_{SRS,b}$ consecutive RBs may be determined as frequency-domain positions for transmitting the SRS by a terminal device. However, this method for determining the frequency-domain positions for transmitting the SRS results in too large bandwidth occupied by the SRS.

SUMMARY

Embodiments of the present disclosure provide a wireless communication method, a terminal device, and a network device.

In a first aspect, a wireless communication method is provided. The method includes: determining, by a terminal device based on a frequency-domain related parameter and a first correspondence, an initial number of resource blocks (RBs) for transmitting a sounding reference signal (SRS) on each orthogonal frequency division multiplexing (OFDM) symbol in consecutive OFDM symbols, the first correspondence being a correspondence between frequency-domain related parameters and initial numbers of RBs; determining, by the terminal device based on the initial number of RBs and the frequency-domain related parameter, first consecutive RBs for transmitting the SRS; and adjusting, by the terminal device based on an adjustment factor, the initial number of RBs to obtain an actual number of RBs smaller than the initial number of RBs, and determining, by the terminal device based on position information, a position of second consecutive RBs for transmitting the SRS in the first consecutive RBs on each OFDM symbol, the number of RBs included in the second consecutive RBs being the actual number of RBs.

In a second aspect, a terminal device is provided. The terminal device includes a processor and a memory. The memory has a computer program stored thereon, and the processor is configured to invoke and execute the computer program stored in the memory to perform the method according to the above first aspect or any implementation thereof.

In a third aspect, a network device is provided. The network device includes a processor and a memory. The memory has a computer program stored thereon, and the processor is configured to invoke and execute the computer program stored in the memory to perform a wireless communication method. The method includes transmitting, by the network device, configuration information of an SRS to a terminal device, the configuration information comprising a frequency-domain related parameter, an adjustment factor, and position information. The frequency-domain related parameter is used to determine an initial number of RBs for transmitting the SRS on each OFDM symbol in consecutive OFDM symbols, the initial number of RBs and the frequency-domain related parameter are used to determine first consecutive RBs for transmitting the SRS, the adjustment factor is used to adjust the initial number of RBs to obtain an actual number of RBs smaller than the initial number of RBs, the position information indicates a position of second consecutive RBs in the first consecutive RBs on each OFDM symbols, and a number of RBs comprised in the second consecutive RBs is the actual number of RBs.

BRIEF DESCRIPTION OF THE DRAWINGS

FIG. 1 is a schematic diagram showing a communication system architecture according to an embodiment of the present disclosure.

FIG. 2 is a schematic diagram of a slot offset between trigger signaling and an SRS transmission according to an embodiment of the present disclosure.

FIG. 3 is a time domain schematic diagram of an SRS according to an embodiment of the present disclosure.

FIG. 4 is another the time domain schematic diagram of an SRS according to an embodiment of the present disclosure.

FIG. 5 is a flowchart of a wireless communication method according to an embodiment of the present disclosure.

FIG. 12 is a schematic block diagram of a terminal device 1200 according to an embodiment of the present disclosure.

FIG. 13 is a schematic block diagram of a network device 1300 according to an embodiment of the present disclosure.

FIG. 14 is a schematic block diagram of a communication device 1400 according to an embodiment of the present disclosure.

DETAILED DESCRIPTION

Figure 6:
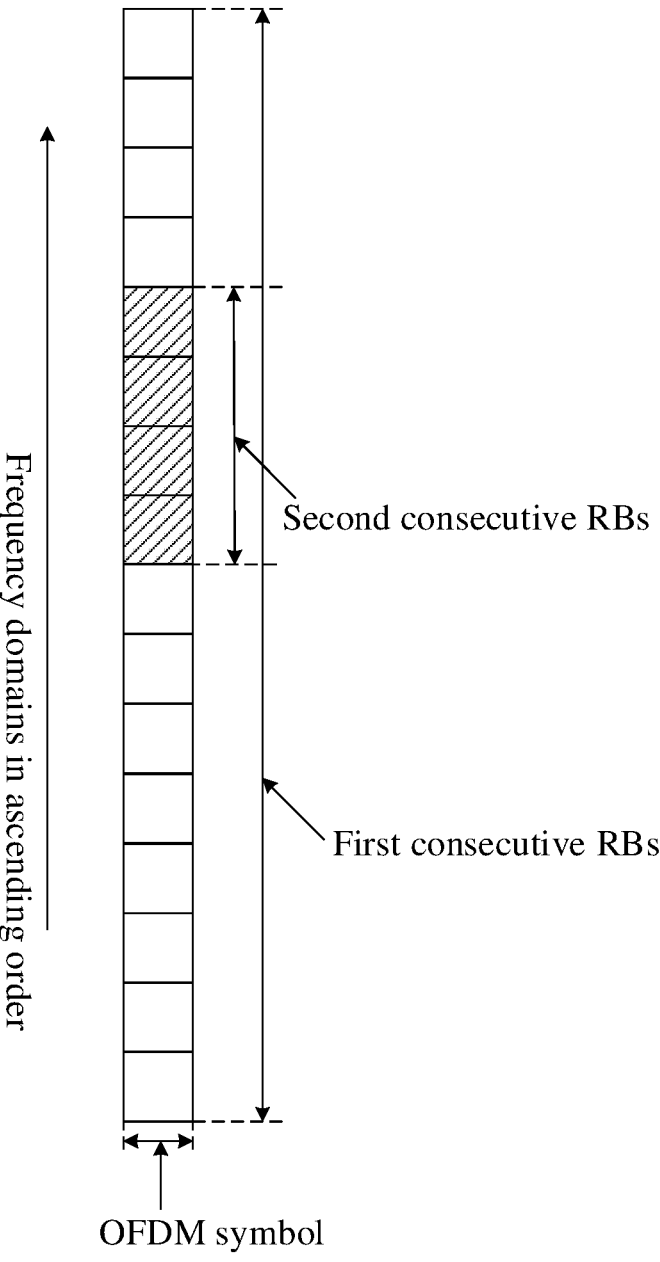
FIG. 6 is a schematic diagram of a frequency-domain distribution of an SRS according to an embodiment of the present disclosure.

The technical solutions in embodiments of the present disclosure will be described below with reference to accompanying drawings. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Optionally, the communication system according to the embodiments of the present disclosure may be applied to a Carrier Aggregation (CA) scenario, a Dual Connectivity (DC) scenario, or a Standalone (SA) network deployment scenario.

The embodiments of the present disclosure do not limit a spectrum to which they are applied. For example, the embodiments of the present disclosure may be applied to a licensed spectrum or an unlicensed spectrum.

Exemplarily, a communication system 100 in which an embodiment of the present disclosure can be applied is schematically shown in FIG. 1. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. In at least one embodiment, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity. The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, a Mobility Management Entity, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system such as a terminal device in an NR network or a terminal device in a future evolved Public Land Mobile Network (PLMN).

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

The network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

It should be understood that, in the present disclosure, Multiple-Input Multiple-Output (MIMO) technology may be used.

Before introducing the technical solutions of the present disclosure, the following describes the related knowledge of the SRS first.

The SRS may be used for uplink Channel State information (CSI) acquisition, downlink channel information acquisition, and uplink beam management. Management and configuration of SRS are performed by the NR system by means of SRS resource sets. Depending on the purpose, a plurality of SRS resource sets may be configured by the network device for the terminal device. Each of the plurality of SRS resource sets includes one or more SRS resources, and each SRS resource includes 1, 2, or 4 ports. Each of the plurality of SRS resource sets has configuration information that includes a usage indication which may be configured as "beamManagement", "codebook", "nonCodebook", or "antennaswitching" indicating uplink beam management, codebook-based CSI acquisition, non-codebook-based CSI acquisition, and downlink channel information acquisition based on SRS antenna switching, respectively.

A transmission of the SRS may be divided into a Periodic transmission, a Semi-persistent transmission, and an Aperiodic transmission, as detailed below.

A periodic SRS refers to a periodically transmitted SRS having a period and a slot offset configured by Radio Resource Control (RRC) signaling. Once the terminal device has received the two configuration parameters, the terminal device will transmit the SRS at a predetermined period until the two configuration parameters become invalid. Spatial Relation Info of the periodic SRS is also configured by the RRC signaling. The Spatial Relation Info may indicate a Channel state information-Reference Signal (CSI-RS), a Synchronization Signal Block (SSB), or a reference SRS. A transmission beam of the SRS is determined by the terminal device based on a receiving beam of the CSI-RS, SSB, or reference SRS.

A semi-persistent SRS is also a periodically transmitted SRS that has a period and a slot offset configured by the RRC signaling but has activation signaling and deactivation signaling that are carried by a media access control control element (MAC CE). After receiving the activation signaling, the terminal device starts to periodically transmit the SRS until it receives the deactivation signaling. Spatial Relation Info of the semi-persistent SRS is also carried by the MAC CE that activates the SRS.

For the periodic SRS and the semi-persistent SRS, after the period and the slot offset configured by the RRC signaling are received by the terminal device, a slot for transmitting the SRS may be determined by the terminal device according to:

$$(N_{slot}^{frame,\mu} n_f + n_{s,f}^{\mu} - T_{offset}) \bmod T_{SRS} = 0$$

where $$N_{slot}^{frame,\mu}$$

is a number of slots per frame, $T_{SRS}$ and $T_{offset}$ are the period and the time offset that are configured by the RRC signaling, $n_f$ and $$n_{s,f}^{\mu}$$

are a radio frame number and a slot number, respectively.

With the introduction of an aperiodic SRS transmission in the NR system, an SRS transmission of the terminal device may be triggered by the network device through uplink control information or Downlink control information (DCI). Trigger signaling for triggering the aperiodic SRS transmission may be carried either by DCI in a UE-exclusive search space for scheduling a Physical Uplink Shared Channel (PUSCH) or a Physical Downlink Shared Channel, or be carried by DCI format 2_3 in a common search space.

After the trigger signaling is received by the terminal device, the SRS transmission is performed by the terminal device on an SRS resource set indicated by the trigger signaling. A slot offset between the trigger signaling and the SRS transmission is configured by higher layer signaling. A configuration parameter of each SRS resource set may be indicated by the network device to the terminal device in advance through the high layer signaling and includes time-frequency resources, sequence parameters, power control parameters, and the like. In addition, for each SRS resource in the triggered SRS resource set, a transmission beam used for transmitting the SRS on the resource may be further determined by the terminal device by means of Spatial Relation Info of the resource. The Spatial Relation Info may be configured to each SRS resource by means of the RRC signaling.

In response to the terminal device receiving the trigger signaling at a slot n, SRS resources in an SRS set indicated by trigger signaling may be transmitted by the terminal device at a slot $$\left\lfloor n \cdot \frac{2^{\mu_{SRS}}}{2^{\mu_{PDCCH}}} \right\rfloor + k,$$

where k is a slot offset between the trigger signaling configured for each SRS set and the SRS transmission, $\mu_{SRS}$ is subcarrier spacing configuration for transmitting the SRS, and $\mu_{PDCCH}$ is subcarrier spacing configuration of a PDCCH carrying the trigger signaling. FIG. 2 is a schematic diagram of a slot offset between trigger signaling and an SRS transmission according to an embodiment of the present disclosure. As illustrated in FIG. 2, the slot offset between the trigger signaling and the SRS transmission is 3, "D" in FIG. 2 represents a downlink slot, "F" represents a flexible slot, and "U" represents an uplink slot.

SRS time-domain resource configuration:

Each SRS resource may be configured in any symbol of a slot. To achieve an enhanced transmission of SRS, the SRS may be transmitted repeatedly by the terminal device. Therefore, each SRS resource may be config- ured to represent a number $$N_{symb}^{SRS}$$

of consecutive OFDM symbols occupied by the SRS resource, and these consecutive OFDM symbols are OFDM symbols for transmitting repeated SRSs.

A time-domain starting symbol of the SRS is calculated according to:

$$l_0 = N_{symb}^{slot} - 1 - l_{offset} \quad (1)$$

where $l_0$ represents the time-domain starting symbol of SRS, $$N_{symb}^{slot}$$

represents a number of OFDM symbols included in a slot, and $l_{offset}$ represents a time offset from the last symbol to the starting symbol of the SRS. For example, FIG. 3 is a time domain schematic diagram of an SRS according to an embodiment of the present disclosure. As illustrated in FIG. 3, $$N_{symb}^{SRS} = 1,$$

$$N_{symb}^{slot} = 14,$$

and $l_{offset}=2$. As calculated according to the above formula, it can be obtained that $l_0=11$ and the number of occupied consecutive OFDM symbols is 1. FIG. 4 is another time domain schematic diagram of an SRS according to an embodiment of the present disclosure. As illustrated in FIG. 4, $$N_{symb}^{SRS} = 4, N_{symb}^{slot} = 14,$$

and $l_{offset}=3$. As calculated according to the above formula, it can be obtained that $l_0=10$ and the number of occupied consecutive OFDM symbols is 4.

SRS resource frequency-domain configuration:

Frequency-domain configuration of the SRS is deter- mined by frequency-domain related parameters $C_{SRS}$ and $B_{SRS}$ in 38.211-Table 6.4.1.4.3-1. A number $m_{SRS,b}$ of consecutive RBs for transmitting the SRS may be determined by the two frequency-domain related parameters, where $b=B_{SRS}$.

TABLE 6

| 4.1.4.3-1:SRS bandwidth configuration | | | | | | | | |
|---|---|---|---|---|---|---|---|---|
| | $B_{SRS}=0$ | | $B_{SRS}=1$ | | $B_{SRS}=2$ | | $B_{SRS}=3$ | |
| $C_{SRS}$ | $m_{SRS}$ | $N_0$ | $m_{SRS}$ | $N_1$ | $m_{SRS}$ | $N_2$ | $m_{SRS}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| . . . | . . . | . . . | . . . | . . . | . . . | . . . | . . . | . . . |

Frequency hopping of the SRS is supported by the NR system. In a case of satisfying $b_{hop}<B_{SRS}$, the SRS is transmitted by the terminal device by means of frequency hopping, where $b_{hop}$ is an RRC configuration parameter. When the SRS is transmitted by the terminal device in a frequency hopping manner, in the Table 6.4.1.4.3-1, $m_{SRS,0}$ is the total bandwidth of SRS frequency hopping, and $m_{SRS,b}$ is a number of consecutive RBs transmitted by each fre- quency hopping, i.e., a number of Physical Resource Blocks (PRBs) transmitted by each frequency hopping. Moreover, a frequency-domain position of each frequency hopping is determined by the terminal device according to:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & others \end{cases} \quad (2)$$

where $n_b$ represents the frequency-domain position of each frequency hopping, $N_b$ represents an integer divisor by which the total bandwidth of the SRS frequency hopping is divided and that is determined by 38.211-Table 6.4.1.4.3-1, and $n_{RRC}$ represents the RRC configuration parameter. $F_b(n_{SRS})$ is determined according to:

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & N_b \text{ is an even number} \\ \lfloor N_b/2 \rfloor \left\lfloor n_{SRS}/\prod_{b'=b_{hop}}^{b-1} N_{b'} \right\rfloor & N_b \text{ is an odd number} \end{cases} \quad (3)$$

where $N_{b_{hop}}=1$, no matter what the value of the parameter $N_b$ is, and $n_{SRS}$ represents an index of a number of times of the SRS frequency hopping. For example, assuming that the number of times of the SRS frequency hopping is 4, the value of $n_{SRS}$ may be 0, 1, 2, and 3.

For the aperiodic SRS, the index of the number of times of the SRS frequency hopping is determined by a formula $n_{SRS}=\lfloor l'/R \rfloor$, where l' represents an index of the number of consecutive OFDM symbols occupied by the SRS. For example, assuming that the number of consecutive OFDM symbols occupied by the SRS is 4, the value of l' may be 0, 1, 2, and 3. R is a repetition factor, i.e., R represents that every R OFDM symbols are subjected to one frequency hopping. For example, when R=1, frequency hopping is performed in a unit of one OFDM symbol; and when R=2, frequency hopping is performed in a unit of two OFDM symbols.

For the periodic SRS and a semi-periodic SRS, the number of times of SRS frequency hopping is determined according to:

$$n_{SRS} = \left( \frac{N_{slot}^{frame,\mu} n_f + n_{s,f}^\mu - T_{offset}}{T_{SRS}} \right) \left( \frac{N_{symb}^{SRS}}{R} \right) + \left\lfloor \frac{l'}{R} \right\rfloor \quad (4)$$

where $$N_{slot}^{frame,\mu}$$

represents the number of slots per frame, $T_{SRS}$ and $T_{offset}$ represent the period and the time offset configured by the RRC signaling, $n_f$ and $$n_{s,f}^\mu$$

represent the radio frame number and the slot number, respectively. Meanings of $$N_{symb}^{SRS},$$

l', and R may be referred to above, and details thereof will be omitted herein.

As described above, $m_{SRS,b}$ consecutive RBs may be determined as frequency-domain positions for transmitting the SRS by the terminal device. However, this method for determining the frequency-domain positions for transmitting the SRS leads to too large occupied bandwidth of the SRS.

To solve the above technical problems, in the present disclosure, it is considered that a narrower bandwidth than the $m_{SRS,b}$ consecutive RBs can be determined as the frequency-domain position of SRS transmission for the following reasons: 1. In an actual network, some uplink or downlink portion in a configured bandwidth part (BWP) may be subjected to severe interference from other wireless systems like a video backhaul system. Therefore, data scheduling is not possible in such frequency-domain parts. In turn, there is no need to transmit the SRS in such frequency-domain parts. 2. In a case of high correlation in frequency domain, a channel has a high correlation across a frequency band. Therefore, as long as the SRS is transmitted on part of the frequency band, a bandwidth without transmitting the SRS may be reconstructed by means of interpolation, which can enhance the coverage of SRS while ensuring the quality of channel detection.

The beneficial effects of the technical solutions according to the present disclosure are that the occupied bandwidth of the SRS can be reduced. Further, two more benefits are provided below: 1. When a transmission bandwidth of the SRS becomes narrower, it is equivalent to increasing power density of SRS, so that additional power gains can be obtained. 2. After the transmission bandwidth of SRS narrows, the rest of the total bandwidth may be allocated by the network device to other users, thereby improving a utilization rate of the bandwidth.

The technical solutions of the present disclosure will be described in detail below.

FIG. 5 is a flowchart of a wireless communication method according to an embodiment of the present disclosure. As illustrated in FIG. 5, the method includes the following actions.

In block S510, an initial number of resource blocks (RBs) for transmitting a sounding reference signal (SRS) on each OFDM symbol in consecutive orthogonal frequency division multiplexing (OFDM) symbols is determined by a terminal device based on a frequency-domain related parameter and a first correspondence. The first correspondence is a correspondence between frequency-domain related parameters and initial numbers of RBs.

In block S520, first consecutive RBs for transmitting the SRS are determined by the terminal device based on the initial number of RBs and the frequency-domain related parameter.

In block S530, the initial number of RBs is adjusted by the terminal device based on an adjustment factor to obtain an actual number of RBs smaller than the initial number of RBs, and a position of second consecutive RBs for transmitting the SRS in the first consecutive RBs on each OFDM symbol is determined by the terminal device based on position information. The number of RBs included in the second consecutive RBs is the actual number of RBs.

Optionally, configuration information of the SRS is obtained by the terminal device. The configuration information includes the frequency-domain related parameter, the adjustment factor, and the position information.

Optionally, the configuration information further includes: a starting OFDM symbol and a number of occupied consecutive OFDM symbols. The starting OFDM symbol and the number of consecutive OFDM symbols are used to determine the consecutive OFDM symbols. Alternatively, the configuration information further includes: a terminating OFDM symbol and a number of occupied consecutive OFDM symbols. The terminating OFDM symbols and the number of consecutive OFDM symbols are used to determine the consecutive OFDM symbols. In summary, how to determine the consecutive OFDM symbols is not limited in the present disclosure.

It should be understood that one or more SRS resource sets may be configured by the network device for the terminal device through the RRC signaling. Each SRS resource set includes one or more SRS resources. The SRS in the present disclosure is also referred to as the SRS resource.

It should be understood that the SRS in the present disclosure may be an SRS in any one of the periodic SRS transmission, the aperiodic SRS transmission, or the semi-persistent SRS transmission. Furthermore, one OFDM symbol may occupied by one SRS transmission; or more than one consecutive OFDM symbols may occupied by the one SRS transmission, i.e., a case of repeated transmission exists.

Optionally, the frequency-domain related parameter of the SRS includes $C_{SRS}$ and $B_{SRS}$ in 38.211-Table 6.4.1.4.3-1, but is not limited thereto.

Optionally, the frequency-domain related parameter of the SRS further includes a parameter $b_{hop}$, but is not limited thereto.

It should be understood that the starting OFDM symbol of the SRS is also referred to as a starting position of the SRS in the time domain.

Optionally, one or more consecutive OFDM symbols are occupied by the SRS.

Optionally, when a plurality of consecutive OFDM symbols are occupied by the SRS, the configuration information of SRS further includes the repetition factor R, i.e., every R OFDM symbols are subjected to one frequency hopping.

It should be understood that the first consecutive RBs are consecutive RBs theoretically used for transmitting the SRS, and the second consecutive RBs are consecutive RBs actually used for transmitting the SRS.

It should be understood that the initial number of RBs refers to a number of RBs included in the first consecutive RBs. The actual number of RBs is a number of RBs obtained by adjusting the initial number of RBs through the adjustment factor, and is also a number of RBs included in the second consecutive RBs.

It should be understood that the adjustment factor is used to adjust the initial number of RBs to obtain the actual number of RBs.

As for the size of the adjustment factor, the following cases may exist, but the disclosure is not limited thereto.

Possible implementation 1: The adjustment factor is any number greater than 1, which may be an integer or a non-integer. For example, the adjustment factor is any one of elements in any one of sets: {2,3,4,8}, {2,4,8}, {2,4}, or {2}.

Optionally, when the adjustment factor is greater than 1, the terminal device may use $$\left\lfloor \frac{1}{PF} m_{SRS,b} \right\rfloor$$

as the actual number of RBs, where PF represents the adjustment factor, $m_{SRS,b}$ represents the initial number of RBs, $\lfloor\ \rfloor$ and represents a round-down operator.

Possible implementation 2: It should be understood that when the initial number of RBs is adjusted by the terminal device through the adjustment factor, the adjustment factor may also cause changes of a sequence length of the SRS. The sequence length of the SRS in this case is referred to as a new sequence length of the SRS, which may be specifically calculated according to:

$$M_{sc,b}^{\prime SRS} = (1/PF)M_{sc,b}^{SRS} \tag{5}$$

$$M_{sc,b}^{SRS} = m_{SRS,b} N_{SC}^{RB} / K_{TC} \tag{6}$$

where $$M_{sc,b}^{\prime SRS}$$

represents the new sequence length of the SRS, PF represents the adjustment factor, $$M_{sc,b}^{SRS}$$

represents a sequence length of the SRS when the initial number of RBs is not adjusted by the adjustment factor, i.e., an original sequence length of the SRS, $$N_{SC}^{RB}$$

represents a number of subcarriers of an RB, and $K_{TC}$ represents a comb number and may be 2, 4, or 8.

In this case, in order to make the new sequence length of the SRS satisfy either of the following conditions, there is a restriction on the size of the PF:
  (1) The new sequence length of the SRS is greater than or equal to 12.
  (2) The new sequence length of the SRS is greater than or equal to a minimum value specified by the current protocol.

Possible implementation 3: The adjustment factor may be greater than 0 and smaller than 1. For example, the adjustment factor is $$\frac{1}{PF}$$

as described above.

Optionally, the adjustment factor is configured based on each SRS resource.

For example, assuming that an SRS resource set is configured by the network device for the terminal device, the SRS resource set includes an SRS resource 1 and an SRS resource 2. Corresponding adjustment factors are configured by the network device for the SRS resource 1 and the SRS resource 2, respectively. The adjustment factors configured for the SRS resource 1 and the SRS resource 2 may be the same or different. The embodiments of the present disclosure are not limited thereto.

Optionally, the adjustment factor is configured based on all SRS resources in each SRS set.

For example, assuming that an SRS resource set is configured by the network device for the terminal device, the SRS resource set includes the SRS resource 1 and the SRS resource 2. The adjustment factor is configured by the network device for the SRS resource set, i.e., the same adjustment factor is configured for the SRS resource 1 and the SRS resource 2.

Optionally, the adjustment factor is determined by a protocol, or is configured by high layer signaling. For example, the adjustment factor is configured by means of the RRC signaling.

Optionally, the adjustment factor may remain constant or be updated by the terminal device according to an update instruction transmitted by the network device. The embodiments of the present disclosure are not limited thereto.

Optionally, the update instruction is MAC CE signaling or DCI, which is not limited in the present disclosure.

It should be understood that the position information indicates a position of second consecutive RBs in the first consecutive RBs on each OFDM symbol.

For example, assuming that the first consecutive RBs is divided into PF parts, i.e., the first consecutive RBs include PF positions in ascending order on the frequency domain called first part, second part, . . . , and PFth part. When the value of the position information is Y, Y may be any one in a set {0,1, . . . PF−1}. For example, Y=2, indicating that the second consecutive RBs is a third part of the first consecutive RBs.

Optionally, the position information is configured based on each SRS resource.

For example, assuming that an SRS resource set is configured by the network device for the terminal device, the SRS resource set includes the SRS resource 1 and the SRS resource 2. Corresponding position information is configured by the network device for the SRS resource 1 and the SRS resource 2, respectively. The position information configured for the SRS resource 1 and the SRS resource 2 may be the same or different. The embodiments of the present disclosure are not limited thereto.

Optionally, the position information is configured based on all SRS resources in each SRS set.

For example, assuming that an SRS resource set is configured by the network device for the terminal device, the SRS resource set includes the SRS resource 1 and the SRS resource 2. The corresponding position information is configured by the network device for the SRS resource set, i.e., the SRS resource 1 and the SRS resource 2 are configured with the same position information.

Optionally, the adjustment factor and the position information may be jointly encoded or independently encoded by the network device. The embodiments of the present disclosure are not limited thereto.

Optionally, before the adjustment factor and the position information are configured by the network device for the terminal device, the terminal device may report its capability to the network device. The capability refers to whether the terminal device supports an adjustment of the transmission bandwidth of the SRS by means of the adjustment factor. In response to the terminal device supporting the adjustment of the transmission bandwidth of the SRS by means of the adjustment factor, the adjustment factor and the position information are configured by the network device for the terminal device. Otherwise, no adjustment factor and position information are configured by the network device for the terminal device.

To sum up, in the present disclosure, the initial number of RBs is adjusted by the terminal device based on the adjustment factor to obtain the actual number of RBs smaller than the initial number of RBs. Moreover, the position of second consecutive RBs for transmitting the SRS in the first consecutive RBs on each OFDM symbol is determined by the terminal device based on the position information. Compared with a solution that does not use the adjustment factor and the position information, the technical solutions provided in the present disclosure achieve the effect of reducing the occupied bandwidth of the SRS. Further, two more benefits are provided below: 1. When the transmission bandwidth of the SRS becomes narrower, it is equivalent to increasing the power density of SRS, thereby allowing the additional power gains. 2. After the transmission bandwidth of SRS narrows, the rest of the total bandwidth may be allocated by the network device to other users, thereby improving the utilization rate of the bandwidth.

It should be understood that, as described above, the SRS may occupy one OFDM symbol or a plurality of consecutive OFDM symbols. For these two cases, descriptions of a value range of and the meaning of the position information are given by way of example, respectively.

Example 1: When a number of occupied consecutive OFDM symbols is equal to 1, the position information has a value being any one in a set {0,1, . . . PF−1}, where PF represents the adjustment factor. For example, when PF=2, the value of Y may be 0 or 1; when PF=4, the value of Y may be 0, 1, 2, or 3; when PF=8, the value of Y may be 0, 1, 2, 3, 4, 5, 6, or 7. First consecutive RBs on the OFDM symbol include PF positions, and one of possible values of the position information corresponds to one of the PF positions. For example, the possible values of the position information correspond to the PF positions in a one-to-one manner. When the value of the position information is Y, the position information represents that the position of the second consecutive RBs of the OFDM symbol in the first consecutive RBs is Y+1. It should be noted that the PF positions may be PF equally divided parts of the first consecutive RBs or PF unequally divided parts of the first consecutive RBs, which is not limited in the present disclosure. A one-to-one correspondence between the possible values of the position information and the PF positions may be any of, but not limited to: the possible values of the position information in ascending order correspond to the PF positions in ascending order on the frequency domain in a one-to-one manner, or the possible values of the position information in ascending order correspond to the PF positions in descending order on the frequency domain in a one-to-one manner. For example, FIG. 6 is a schematic diagram of an frequency-domain distribution of an SRS according to an embodiment of the present disclosure. As illustrated in FIG. 6, assuming that PF=4 and Y=2, the first consecutive RBs is divided into PF=4 equal parts by the terminal device on the OFDM symbol. The second consecutive RBs is a Y+1=3rd equal part of the first consecutive RBs in ascending order of the frequency domain.

Figure 7:
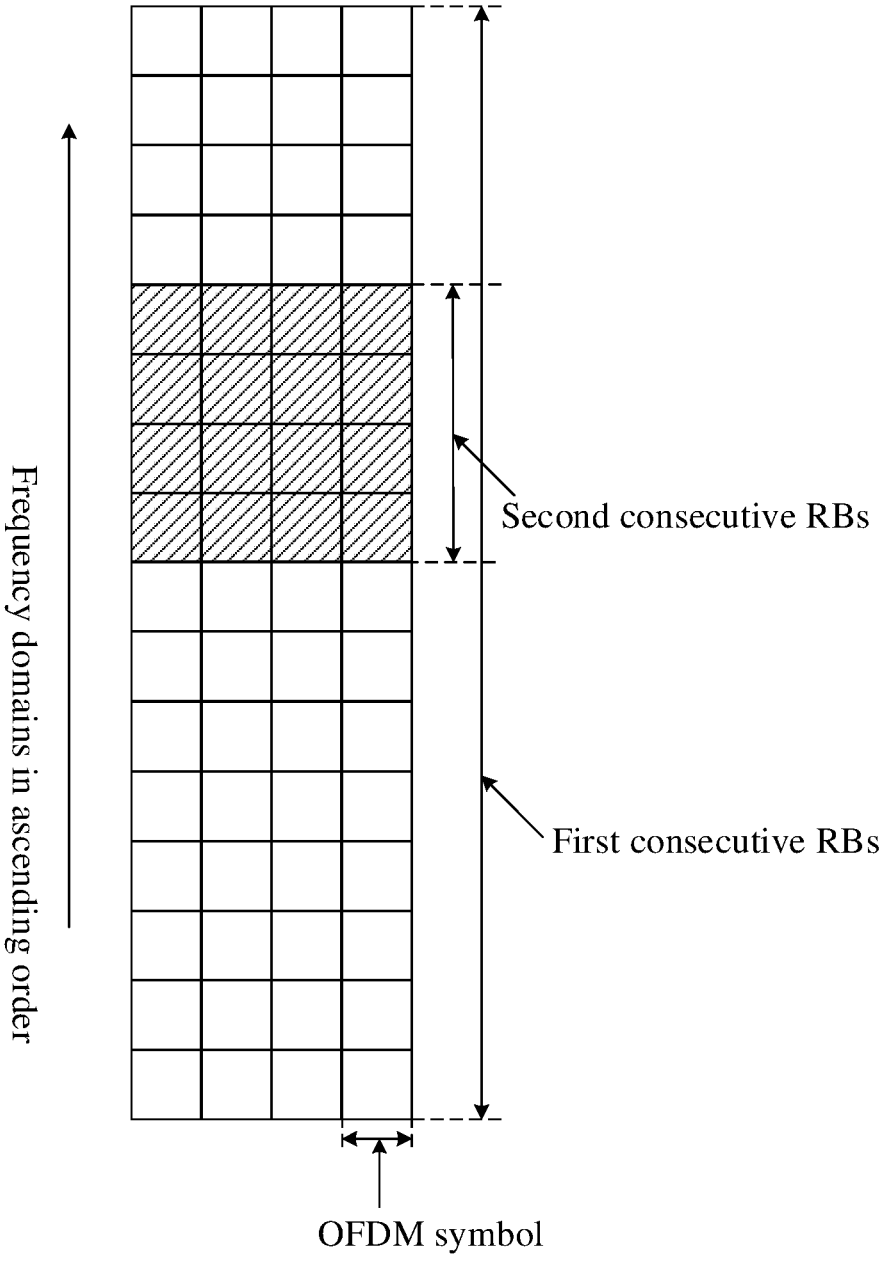
FIG. 7 is a schematic diagram of another frequency-domain distribution of an SRS according to an embodiment of the present disclosure.

Example 2: When a number of occupied consecutive OFDM symbols is greater than 1, in response to determining not to start frequency hopping based on the frequency-domain related parameter and determining based on the position information that frequency-domain positions of the SRS on the consecutive OFDM symbols are identical, the position information has a value being any one in a set {0,1, . . . PF−1}, where PF represents the adjustment factor. For example, when PF=2, the value of Y may be 0 or 1; when PF=4, the value of Y may be 0, 1, 2, or 3; when PF=8, the value of Y may be 0, 1, 2, 3, 4, 5, 6, or 7. First consecutive RBs on each OFDM symbol include PF positions, and one of possible values of the position information corresponds to one of the PF positions. For example, possible values of the position information correspond to the PF positions on each OFDM symbol in a one-to-one manner. When the value of the position information is Y, the position information represents that the position of the second consecutive RBs of each OFDM symbol in the first consecutive RBs is Y+1. It should be noted that the PF positions on each OFDM symbol may be PF equally divided parts of the first consecutive RBs or PF unequally divided parts of the first consecutive RBs, which is not limited in the present disclosure. For each OFDM symbol, the one-to-one correspondence between the possible values of the position information and the PF positions on the symbol may be any of, but not limited to: the possible values of the position information in ascending order correspond to the PF positions in ascending order on the frequency domain in a one-to-one manner, or the possible values of the position information in ascending order correspond to the PF positions in descending order on the frequency domain in a one-to-one manner. For example, FIG. 7 is a schematic diagram of another frequency-domain distribution of an SRS according to an embodiment of the present disclosure. As illustrated in FIG. 7, assuming that Ns=4, PF=4, and Y=2, where Ns represents the number of consecutive OFDM symbols, for each of the four consecutive OFDM symbols, the first consecutive RBs is divided into PF=4 equal parts by the terminal device on the OFDM symbol. The second consecutive RBs on the OFDM symbol is the Y+1=3rd equal part of the first consecutive RBs in ascending order of the frequency domain. It should be noted that, for clarity, FIG. 7 only shows first consecutive RBs and second consecutive RBs on the fourth OFDM symbol in the four consecutive OFDM symbols. In fact, each OFDM symbol has the first consecutive RBs and the second consecutive RBs thereon.

It should be noted that when the terminal device determines that $b_{hop} < B_{SRS}$, it means that the frequency hopping is started. When the terminal device determines that $b_{hop} \geq B_{SRS}$, it means that frequency hopping is not started, and this will not be repeated below.

It should be noted that when one piece of the position information is provided, it represents that the frequency-domain positions of the SRS on the consecutive OFDM symbols are identical. Conversely, when the position information includes a plurality of pieces of sub-information, it represents that the frequency-domain positions of the SRS on the consecutive OFDM symbols are not identical, and this will be repeated below.

Figure 8:
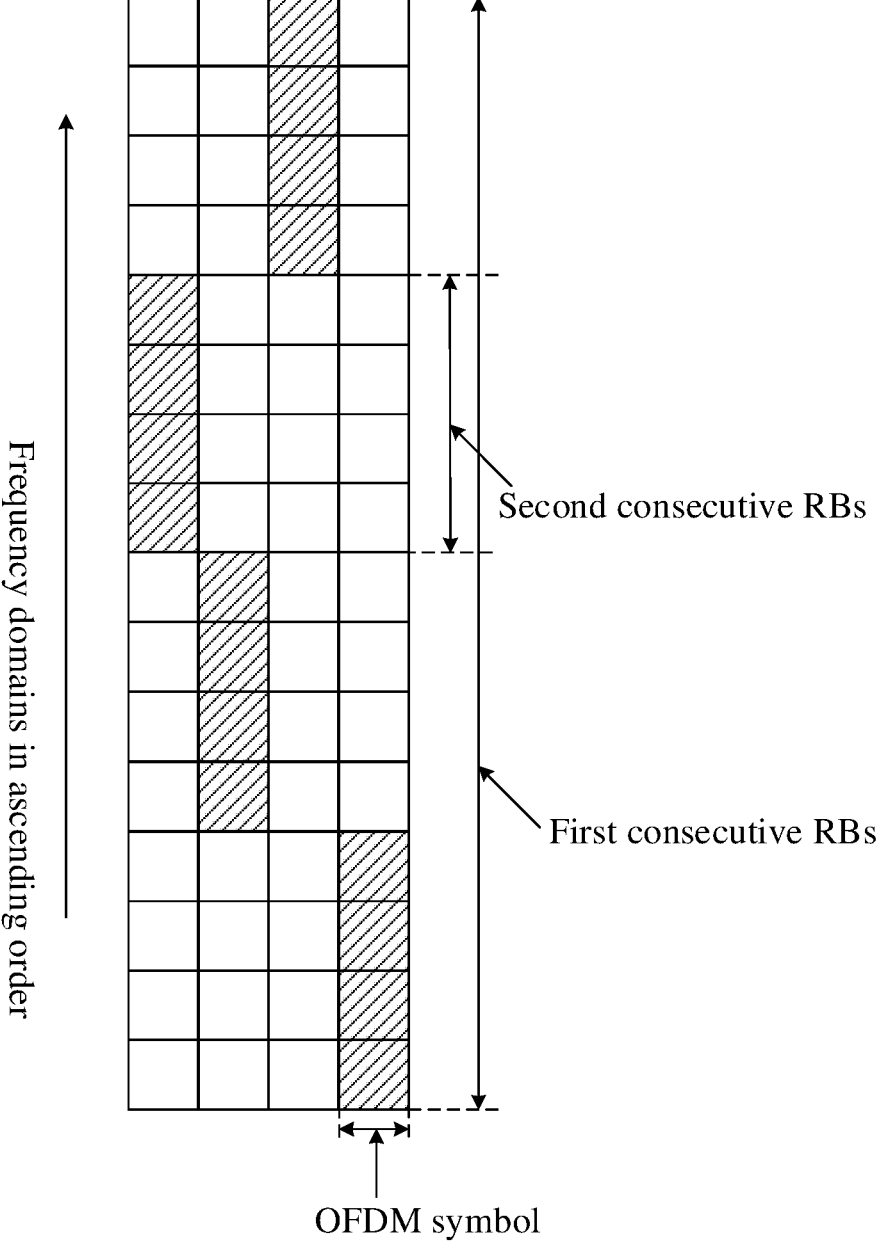
FIG. 8 is a schematic diagram of yet another frequency-domain distribution of an SRS according to an embodiment of the present disclosure.

Example 3: When a number of consecutive OFDM symbols occupied by the SRS is greater than 1, in response to determining not to start frequency hopping based on the frequency-domain related parameter and determining based on the position information that frequency-domain positions of the SRS on the consecutive OFDM symbols are not identical, the position information includes Ns pieces of first sub-information. Ns represents the number of consecutive OFDM symbols occupied by the SRS, each piece of the first sub-information has a value being any one in a set {0,1, . . . PF−1}, and PF represents the adjustment factor. For example, when PF=2, each piece of the first sub-information has a value being 0 or 1; when PF=4, each piece of the first sub-information has a value being 0, 1, 2, or 3; when PF=8, each piece of the first sub-information has a value being 0, 1, 2, 3, 4, 5, 6, or 7. The Ns pieces of first sub-information correspond to the consecutive OFDM symbols in a one-to-one manner. First consecutive RBs on each OFDM symbol include PF positions, and one of possible values of the first sub-information corresponding to each OFDM symbol corresponds to one of the PF positions. For example, possible values of the first sub-information corresponding to each OFDM symbol correspond to the PF positions on the OFDM symbol in a one-to-one manner. When the value of the first sub-information corresponding to each OFDM symbol is Y, the first sub-information corresponding to each OFDM symbol represents that the position of the second consecutive RBs in the first consecutive RBs on each OFDM symbol is Y+1. It should be noted that, for each OFDM symbol, the PF positions thereon may be PF equally divided parts of the first consecutive RBs or PF unequally divided parts of the first consecutive RBs, which is not limited in the present disclosure. For each OFDM symbol, a one-to-one correspondence between the possible values of the first sub-information and the PF positions on the symbol may be any of, but not limited to: the possible values of the first sub-information in ascending order correspond to the PF positions in ascending order on the frequency domain in a one-to-one manner, or the possible values of the first sub-information in ascending order correspond to the PF positions in descending order on the frequency domain in a one-to-one manner. For example, FIG. 8 is a schematic diagram of yet another frequency-domain distribution of an SRS according to an embodiment of the present disclosure. As illustrated in FIG. 8, assuming that Ns=4, PF=4, and Y=2130, where each number in "2130" is one of possible values of the first sub-information, on each of the four consecutive OFDM symbols, the first consecutive RBs on the OFDM symbol is divided into PF=4 equal parts by the terminal device. In ascending order of the frequency domain, second consecutive RBs on a first OFDM symbol is a 2+1=3rd equal part of the first consecutive RBs, second consecutive RBs on a second OFDM symbol is a 1+1=2nd equal part of the first consecutive RBs, second consecutive RBs on a third OFDM symbol is a 3+1=4th equal part of the first consecutive RBs, and second consecutive RBs on a fourth OFDM symbol is a 0+1=1st equal part of the first consecutive RBs. For clarity, FIG. 8 only shows the first consecutive RBs and the second consecutive RBs on the fourth OFDM symbol in the four consecutive OFDM symbols. In fact, each OFDM symbol has the first consecutive RBs and the second consecutive RBs thereon.

Example 4: When a number of consecutive OFDM symbols occupied by the SRS is greater than 1, in response to determining to start frequency hopping based on the frequency-domain related parameter and determining based on the position information that frequency-domain positions of the SRS on the first consecutive RBs corresponding respectively to the consecutive OFDM symbols are identical, the position information has a value being any one in a set {0,1, . . . PF−1}, where PF represents the adjustment factor. For example, when PF=2, the value of Y may be 0 or 1; when PF=4, the value of Y may be 0, 1, 2, or 3; when PF=8, the value of Y may be 0, 1, 2, 3, 4, 5, 6, or 7. First consecutive RBs on each OFDM symbol include PF positions, and one of possible values of the position information corresponds to one of the PF positions. For example, possible values of the position information correspond to the PF positions on each OFDM symbol in a one-to-one manner. When the value of the position information is Y, the position information represents that the position of the second consecutive RBs of each OFDM symbol in the first consecutive RBs is Y+1. It should be noted that the PF positions on each OFDM symbol may be PF equally divided parts of the first consecutive RBs or PF unequally divided parts of the first consecutive RBs, which is not limited in the present disclosure. For each OFDM symbol, the one-to-one correspondence between the possible values of the position information and the PF positions on the symbol may be any of, but not limited to: the possible values of the position information in ascending order correspond to the PF positions in ascending order on the frequency domain in a one-to-one manner, or the possible values of the position information in ascending order correspond to the PF positions in descending order on the frequency domain in a one-to-one manner.

Figure 9:
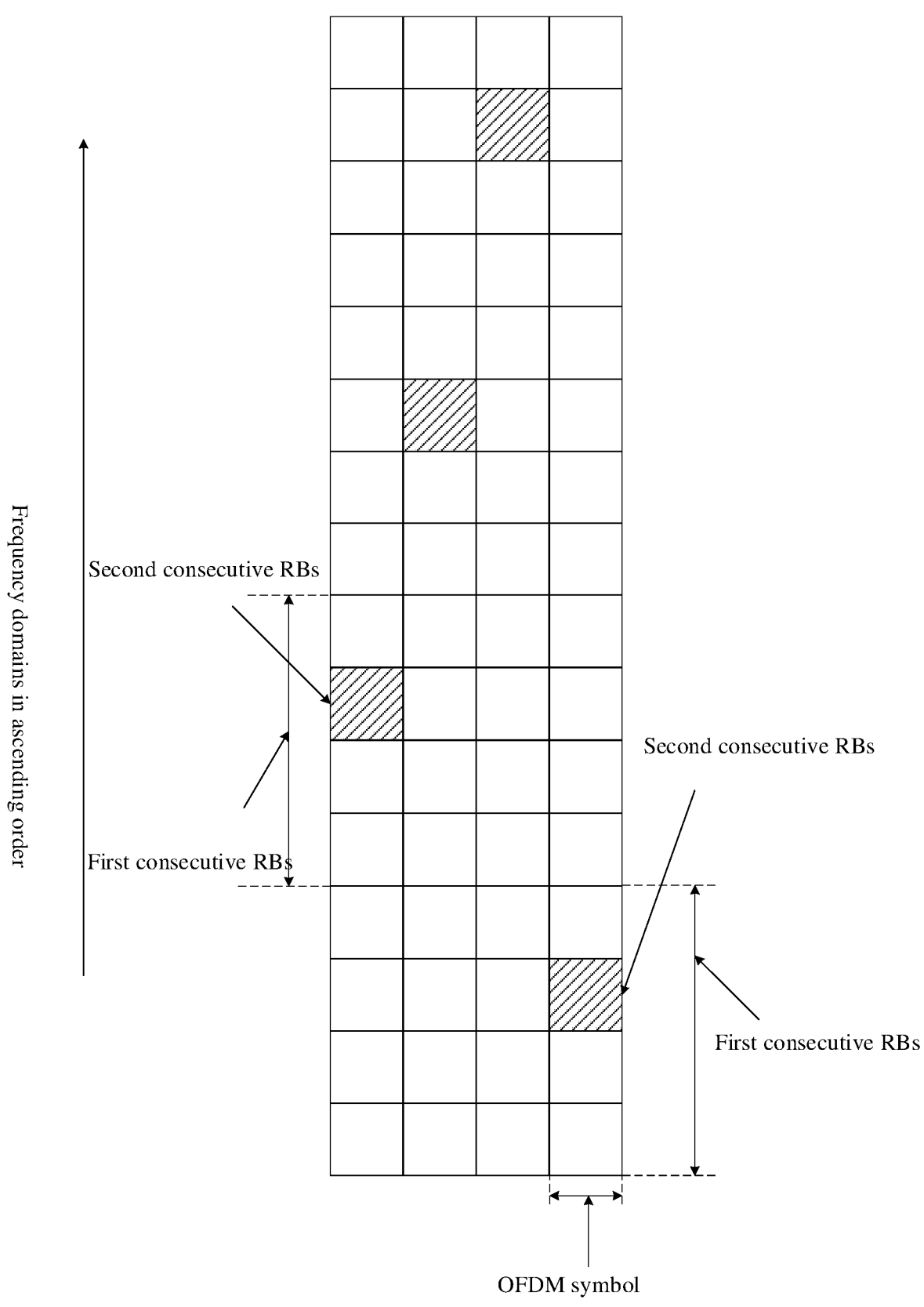
FIG. 9 is a schematic diagram of still yet another frequency-domain distribution of an SRS according to an embodiment of the present disclosure.

It should be noted that in Example 4, since the terminal device determines to start the frequency hopping based on the frequency-domain related parameter, a first frequency hopping position, i.e., the first consecutive RBs on each OFDM symbol, may be determined by the terminal device through the above formula (2). In addition, the position of the second consecutive RBs in the first consecutive RBs on each OFDM symbol is determined by the terminal device based on the value Y of the position information. For example, FIG. 9 is a schematic diagram of still yet another frequency-domain distribution of an SRS according to an embodiment of the present disclosure. As illustrated in FIG. 9, assuming that Ns=4, PF=4, Y=2, and that the first frequency hopping positions determined by the terminal device according to formula (2) as described above are 1230. That is, it is assumed that the bandwidth is divided into 4 equal parts; in ascending order of frequency domains, an index of first consecutive RBs on the first OFDM symbol among the four consecutive OFDM symbols is 1, an index of first consecutive RBs on the second OFDM symbol is 2, an index of first consecutive RBs on the third OFDM symbol is 3, and an index of first consecutive RBs on the fourth OFDM symbol is 0. Further, on each of the four consecutive OFDM symbols, the terminal device divides the first consecutive RBs on the OFDM symbol into PF=4 equal parts. The second consecutive RBs on the OFDM symbol is the Y+1=3rd equal part of the first consecutive RBs in ascending order of the frequency domain.

Figure 10:
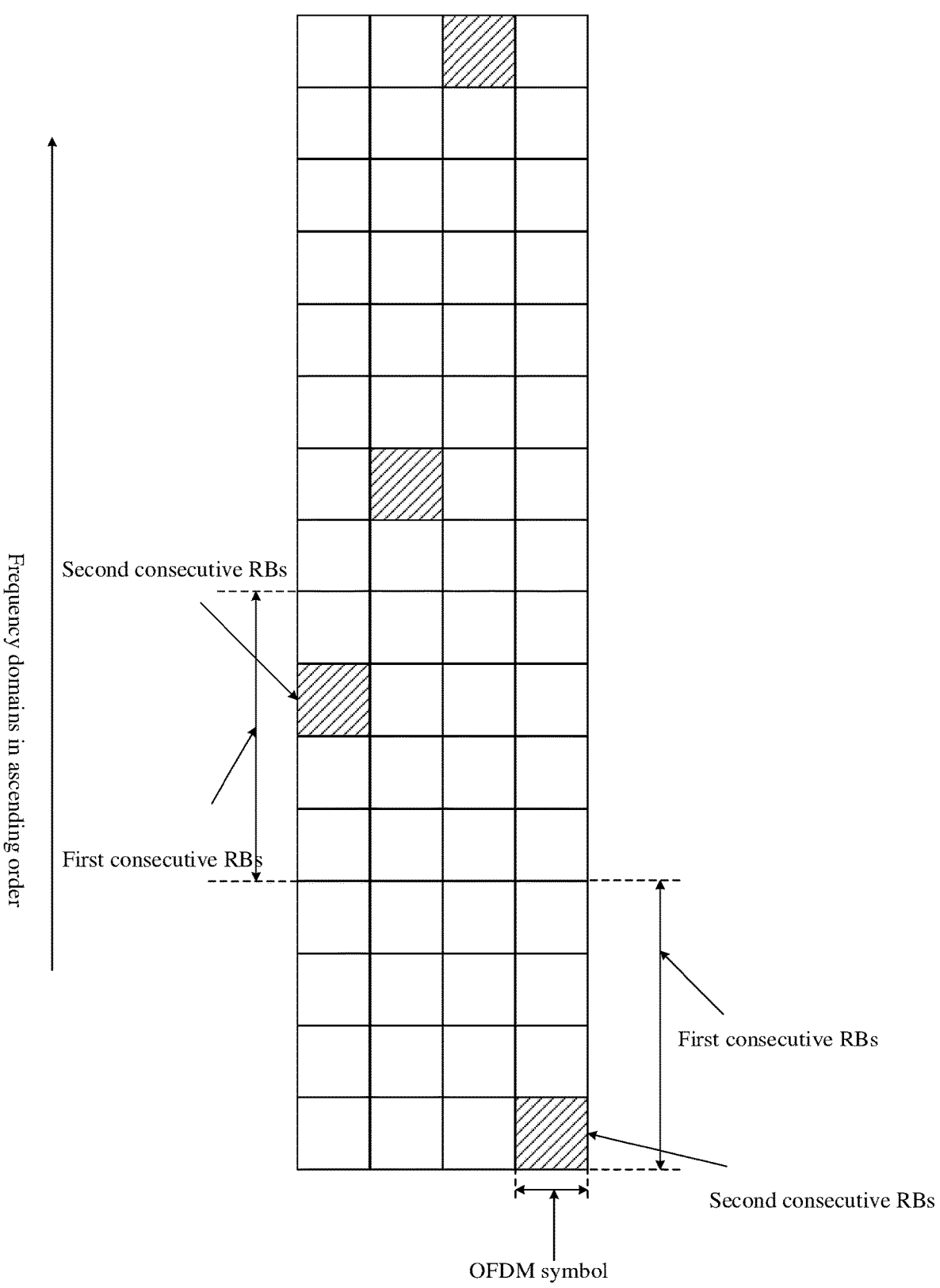
FIG. 10 is a schematic diagram of a further frequency-domain distribution of an SRS according to an embodiment of the present disclosure.

Example 5: When a number of consecutive OFDM symbols occupied by the SRS is greater than 1, in response to determining to start frequency hopping based on the frequency-domain related parameter and determining based on the position information that frequency-domain positions of the SRS on the first consecutive RBs corresponding respectively to the consecutive OFDM symbols are not identical, the position information includes Ns/R pieces of second sub-information, where Ns represents the number of consecutive OFDM symbols occupied by the SRS, R represents that every R OFDM symbols are subjected to one frequency hopping, and each piece of the second sub-information has a value being any one in a set {0,1, . . . PF−1}, and PF represents the adjustment factor. For example, when PF=2, each piece of the second sub-information has a value being 0 or 1; when PF=4, each piece of the second sub-information has a value being 0, 1, 2, or 3; when PF=8, each piece of the second sub-information has a value being 0, 1, 2, 3, 4, 5, 6, or 7. The Ns/R pieces of second sub-information correspond to Ns/R groups of OFDM symbols in the consecutive OFDM symbols in a one-to-one manner. First consecutive RBs on each OFDM symbol include PF positions, and one of possible values of the second sub-information corresponding to each OFDM symbol corresponds to one of the PF positions. For example, the possible values of the second sub-information corresponding to each OFDM symbol correspond to the PF positions on each OFDM symbol in a one-to-one manner. In response to that the value of the second sub-information corresponding to each OFDM symbol is Y, the second sub-information corresponding to each OFDM symbol represents that the position of the second consecutive RBs in the first consecutive RBs on each OFDM symbol is Y+1. It should be noted that, for each OFDM symbol, the PF positions thereon may be PF equally divided parts of the first consecutive RBs or PF unequally divided parts of the first consecutive RBs, which is not limited in the present disclosure. For each OFDM symbol, a one-to-one correspondence between the possible values of the second sub-information and the PF positions on the symbol may be any of, but not limited to: the possible values of the second sub-information in ascending order correspond to the PF positions in ascending order on the frequency domain in a one-to-one manner, or the possible values of the second sub-information in ascending order correspond to the PF positions in descending order on the frequency domain in a one-to-one manner. For example, FIG. 10 is a schematic diagram of a further frequency-domain distribution of an SRS according to an embodiment of the present disclosure. As illustrated in FIG. 10, assuming that Ns=4, PF=4, and Y=2130, and that the first frequency hopping positions determined by the terminal device according to formula (2) as described above are 1230. That is, it is assumed that the bandwidth is divided into 4 equal parts; in ascending order of frequency domains, an index of first consecutive RBs on the first OFDM symbol among the four consecutive OFDM symbols is 1, an index of first consecutive RBs on the second OFDM symbol is 2, an index of first consecutive RBs on the third OFDM symbol is 3, and an index of first consecutive RBs on the fourth OFDM symbol is 0. Further, on each of the four consecutive OFDM symbols, the terminal device divides the first consecutive RBs on the OFDM symbol into PF=4 equal parts. In ascending order of the frequency domain, second consecutive RBs on the first OFDM symbol is the 2+1=3rd equal part of the first consecutive RBs, second consecutive RBs on the second OFDM symbol is a 1+1=2nd equal part of the first consecutive RBs, second consecutive RBs on the third OFDM symbol is a 3+1=4th equal part of the first consecutive RBs, and second consecutive RBs on the fourth OFDM symbol is a 0+1=1st equal part of the first consecutive RBs.

Example 6: When a number of consecutive OFDM symbols occupied by the SRS is greater than 1, in response to determining to start frequency hopping based on the frequency-domain related parameter and determining based on the position information that frequency-domain positions of the SRS on the first consecutive RBs corresponding respectively to the consecutive OFDM symbols are not identical, the terminal device determines, based on at least one of the position information, an index of a number of times of the frequency hopping, and the adjustment factor, the position of the second consecutive RBs in the first consecutive RBs on each OFDM symbol. The indexes of the number of times of the frequency hopping correspond to the consecutive OFDM symbols in a one-to-one manner.

Optionally, the position of the second consecutive RBs in the first consecutive RBs on each OFDM symbol may be determined by the terminal device based on:

$$Z_{(n_{SRS})} = \begin{cases} Y & b \leq b_{hop} \\ (FY_b(n_{SRS}) + Y) \bmod PF & others \end{cases} \quad (7)$$

where $FY_b$ ($n_{SRS}=n_{SRS}$, $n_{SRS}$ represents the index of the number of times of the frequency hopping, which ranges in value from 0 to Ns/R−1, where Ns represents the number of occupied consecutive OFDM symbols, and R represents that every R OFDM symbols are subjected to one frequency hopping. For example, when the number of times of the frequency hopping is 4, the value of $n_{SRS}$ may be 0, 1, 2, or 3. Other parameters in formula (7) can be found above, and details thereof will be omitted herein.

Figure 11:
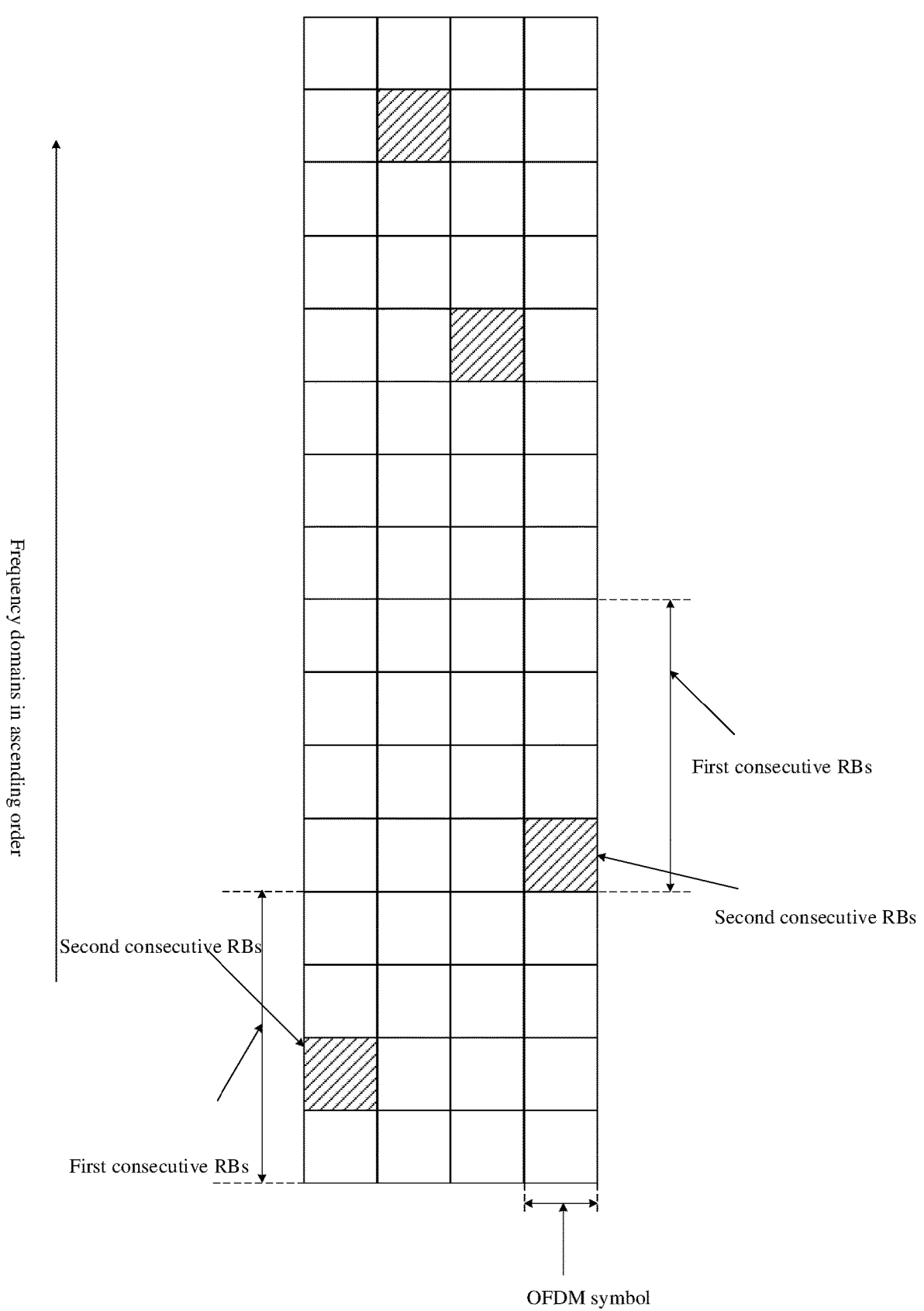
FIG. 11 is a schematic diagram of still yet a further frequency-domain distribution of an SRS according to an embodiment of the present disclosure.

For example, FIG. 11 is a schematic diagram of still yet a further frequency-domain distribution of an SRS according to an embodiment of the present disclosure. As illustrated in FIG. 11, assuming that Ns=4, PF=4, and R=1, and that the first frequency hopping positions determined by the terminal device according to formula (2) as described above is 0321. That is, it is assumed that the bandwidth is divided into 4 equal parts; in ascending order of frequency domains, the index of the first consecutive RBs on the first OFDM symbol among the four consecutive OFDM symbols is 0, the index of the first consecutive RBs on the second OFDM symbol is 3, the index of the first consecutive RBs on the third OFDM symbol is 2, and the index of the first consecutive RBs on the fourth OFDM symbol is 1. Further, on each of the four consecutive OFDM symbols, $Z_{(0)}=1$, $Z_{(1)}=2$, $Z_{(2)}=3$, and $Z_{(3)}=0$ can be calculated according to the formula (7), i.e., the terminal device divides the first consecutive RBs on the OFDM symbol into PF=4 equal parts. In ascending order of the frequency domain, the second consecutive RBs on the first OFDM symbol is the $Z_{(0)}+1=$2nd equal part of the first consecutive RBs, the second consecutive RBs on the second OFDM symbol is the $Z_{(1)}+1=$3rd equal part of the first consecutive RBs, the second consecutive RBs on the third OFDM symbol is the $Z_{(2)}+1=4$ th equal part of the first consecutive RBs, and the second consecutive RBs on the fourth OFDM symbol is the $Z_{(3)}+1=1$ st equal part of the first consecutive RBs.

It should be noted that in each of the above examples, both the adjustment factor and position information are used by the terminal device. In practice, the adjustment factor and position information may also be limited by the terminal device. For example, the adjustment factor and the position information are obtained when the frequency hopping is started. That is, when the frequency hopping is not started, no adjustment factor and position information are configured for the terminal device by the network device, or the terminal device does not expect to obtain the adjustment factor and position information.

Alternatively, the adjustment factor and the position information do not work when the frequency hopping is not started. That is, even though the adjustment factor and position information are configured by the network device for the terminal device, the terminal device does not use the adjustment factor and position information when not starting the frequency hopping.

FIG. 12 is a schematic block diagram of a terminal device 1200 according to an embodiment of the present disclosure. As illustrated in FIG. 12, the terminal device 1200 includes a processing unit 1210 configured to: determine, based on a frequency-domain related parameter and a first correspondence, an initial number of RBs for transmitting an SRS on each of OFDM symbols, the first correspondence being a correspondence between frequency-domain related parameters and initial numbers of RBs; determine, based on the initial number of RBs and the frequency-domain related parameter, first consecutive RBs for transmitting the SRS; and adjust, based on an adjustment factor, the initial number of RBs to obtain an actual number of RBs smaller than the initial number of RBs, and determine, based on position information, a position of second consecutive RBs for transmitting the SRS in the first consecutive RBs on each OFDM symbol. The number of RBs included in the second consecutive RBs is the actual number of RBs.

Optionally, the position information indicates the position of the second consecutive RB in the first consecutive RBs on each OFDM symbol.

Optionally, the adjustment factor is greater than 1.

Optionally, the adjustment factor is any one of elements in any one of sets: $\{2,3,4,8\}$, $\{2,4,8\}$, $\{2,4\}$, or $\{2\}$.

Optionally, the processing unit 1210 is specifically configured to: calculate a product of a reciprocal of the adjustment factor and the initial number of RBs to obtain a product result; and perform a round-down operation on the product result to obtain the actual number of RBs.

Optionally, when a number of consecutive OFDM symbols occupied by the SRS is equal to 1, the position information has a value being any one in a set $\{0,1, \ldots PF-1\}$, where PF represents the adjustment factor.

Optionally, when a number of consecutive OFDM symbols occupied by the SRS is greater than 1, in response to determining not to start frequency hopping based on the frequency-domain related parameter and determining that frequency-domain positions of the SRS on the consecutive OFDM symbols are identical based on the position information, the position information has a value being any one in a set $\{0,1, \ldots PF-1\}$, where PF represents the adjustment factor.

Optionally, when a number of consecutive OFDM symbols occupied by the SRS is greater than 1, in response to determining to start frequency hopping based on the frequency-domain related parameter and determining that frequency-domain positions of the SRS on the first consecutive RBs corresponding respectively to the consecutive OFDM symbols are identical based on the position information, the position information has a value being any one in a set $\{0,1, \ldots PF-1\}$, where PF represents the adjustment factor.

Optionally, first consecutive RBs on each OFDM symbol include PF positions, and one of possible values of the position information corresponds to one of the PF positions; and when the value of the position information is Y, the position information represents that the position of the second consecutive RBs of each OFDM symbol in the first consecutive RBs is Y+1.

Optionally, when a number of consecutive OFDM symbols occupied by the SRS is greater than 1, in response to determining not to start frequency hopping based on the frequency-domain related parameter and determining that frequency-domain positions of the SRS on the consecutive OFDM symbols are not identical based on the position information, the position information includes Ns pieces of first sub-information, where Ns represents the number of consecutive OFDM symbols occupied by the SRS, each piece of the first sub-information has a value being any one in a set $\{0,1, \ldots PF-1\}$, and PF represents the adjustment factor.

Optionally, the Ns pieces of first sub-information correspond to the consecutive OFDM symbols in a one-to-one manner. First consecutive RBs on each OFDM symbol include PF positions, and one of possible values of the first sub-information corresponding to each OFDM symbol corresponds to one of the PF positions. When the value of the first sub-information corresponding to each OFDM symbol is Y, the first sub-information corresponding to each OFDM symbol represents that the position of the second consecutive RBs in the first consecutive RBs on each OFDM symbol is Y+1.

Optionally, when a number of consecutive OFDM symbols occupied by the SRS is greater than 1, in response to determining to start frequency hopping based on the frequency-domain related parameter and determining that frequency-domain positions of the SRS on the first consecutive RBs corresponding respectively to the consecutive OFDM symbols are not identical based on the position information, the position information includes Ns/R pieces of second sub-information, where Ns represents the number of consecutive OFDM symbols occupied by the SRS, R represents that every R OFDM symbols are subjected to one frequency hopping, and each piece of the second sub-information has a value being any one in a set $\{0,1, \ldots PF-1\}$, and PF represents the adjustment factor.

Optionally, the Ns/R pieces of second sub-information correspond to Ns/R groups of OFDM symbols in the consecutive OFDM symbols in a one-to-one manner. First consecutive RBs on each OFDM symbol include PF positions, and one of possible values of the second sub-information corresponding to each OFDM symbol corresponds to one of the PF positions. In response to that the value of the second sub-information corresponding to each OFDM symbol is Y, the second sub-information corresponding to each OFDM symbol represents that the position of the second consecutive RBs in the first consecutive RBs on each OFDM symbol is Y+1.

Optionally, the processing unit 1210 is specifically configured to: when a number of consecutive OFDM symbols occupied by the SRS is greater than 1, in response to determining to start frequency hopping based on the frequency-domain related parameter and determining that frequency-domain positions of the SRS on the first consecutive RBs corresponding respectively to the consecutive OFDM symbols are not identical based on the position information, determine, based on at least one of the position information, an index of a number of times of the frequency hopping, and the adjustment factor, the position of the second consecutive RBs in the first consecutive RBs on each OFDM symbol.

Optionally, the indexes of the number of times of the frequency hopping correspond to the consecutive OFDM symbols in a one-to-one manner.

Optionally, the processing unit 1210 is specifically configured to: calculate a sum of an index corresponding to each OFDM symbol and the value of the position information to obtain a sum result; and perform a modulo operation on the sum result and the adjustment factor to obtain the position of the second consecutive RBs in the first consecutive RBs on each OFDM symbol.

Optionally, the index of the number of times of the frequency hopping ranges in value from 0 to Ns/R−1, where Ns represents the number of consecutive OFDM symbols occupied by the SRS, and R represents that every R OFDM symbols are subjected to one frequency hopping.

Optionally, the adjustment factor and the position information are obtained when the frequency hopping is started; or the adjustment factor and the position information do not work when the frequency hopping is not started.

Optionally, the adjustment factor and the position information are jointly encoded or independently encoded.

Optionally, the adjustment factor is configured based on each SRS resource or all SRS resources in each SRS set.

Optionally, the position information is configured based on each SRS resource or all SRS resources in each SRS set.

Optionally, a sequence length of the SRS adjusted by the adjustment factor needs to be greater than or equal to a predetermined length.

Optionally, the predetermined length is 12 or a minimum length specified by a protocol.

Optionally, the adjustment factor is determined by a protocol, or is configured by high layer signaling.

Optionally, the terminal device further includes a communication unit 1220 configured to obtain an update instruction. The processing unit 1210 is further configured to update the adjustment factor based on the update instruction.

Optionally, the update instruction is media access control control element (MAC CE) signaling or downlink control information (DCI).

Optionally, the communication unit 1220 is further configured to obtain configuration information of the SRS. The configuration information includes the frequency-domain related parameter, the adjustment factor, and the position information.

Optionally, the configuration information further includes: a starting OFDM symbol and a number of occupied consecutive OFDM symbols. The starting OFDM symbol and the number of consecutive OFDM symbols are used to determine the consecutive OFDM symbols.

Optionally, in some embodiments, the communication unit may be a communication interface or a transceiver, or an input/output interface of a communication chip or a system-on-chip. The processing unit may be one or more processors.

It should be understood that the terminal device 1200 according to the embodiments of the present disclosure may correspond to the terminal device in the method embodiments of the present disclosure, and the above and other operations and/or functions of each unit in the terminal device 1200 are respectively intended to implement corresponding procedures of the network device in the method embodiments described above. For brevity, details thereof will be omitted herein.

FIG. 13 is a schematic block diagram of a network device 1300 according to an embodiment of the present disclosure. As illustrated in FIG. 13, the network device 1300 includes a communication unit 1310 configured to transmit configuration information of an SRS to a terminal device. The configuration information includes a frequency-domain related parameter, an adjustment factor, and position information. The frequency-domain related parameter is used to determine an initial number of RBs for transmitting the SRS on each OFDM symbol in consecutive OFDM symbols, the initial number of RBs and the frequency-domain related parameter are used to determine first consecutive RBs for transmitting the SRS, the adjustment factor is used to adjust the initial number of RBs to obtain an actual number of RBs smaller than the initial number of RBs, the position information indicates a position of second consecutive RBs in the first consecutive RBs on each OFDM symbol, and the number of RB included in the second consecutive RBs is the actual number of RBs.

Optionally, the adjustment factor is greater than 1.

Optionally, the adjustment factor is any one of elements in any one of sets: {2,3,4,8}, {2,4,8}, {2,4}, or {2}.

Optionally, when a number of consecutive OFDM symbols occupied by the SRS is equal to 1, the position information has a value being any one in a set {0,1, . . . PF−1}, where PF represents the adjustment factor.

Optionally, when a number of consecutive OFDM symbols occupied by the SRS is greater than 1, in response to determining not to start frequency hopping based on the frequency-domain related parameter and determining that frequency-domain positions of the SRS on the consecutive OFDM symbols are identical based on the position information, the position information has a value being any one in a set {0,1, . . . PF−1}, where PF represents the adjustment factor.

Optionally, when a number of consecutive OFDM symbols occupied by the SRS is greater than 1, in response to determining to start frequency hopping based on the frequency-domain related parameter and determining that frequency-domain positions of the SRS on the first consecutive RBs corresponding respectively to the consecutive OFDM symbols are identical based on the position information, the position information has a value being any one in a set {0,1, . . . PF−1}, where PF represents the adjustment factor.

Optionally, first consecutive RBs on each OFDM symbol include PF positions, and one of possible values of the position information corresponds to one of the PF positions; and when the value of the position information is Y, the position information represents that the position of the second consecutive RBs of each OFDM symbol in the first consecutive RBs is Y+1.

Optionally, when a number of consecutive OFDM symbols occupied by the SRS is greater than 1, in response to determining not to start frequency hopping based on the frequency-domain related parameter and determining that frequency-domain positions of the SRS on the consecutive OFDM symbols are not identical based on the position information, the position information includes Ns pieces of first sub-information, where Ns represents the number of consecutive OFDM symbols occupied by the SRS, each piece of the first sub-information has a value being any one in a set {0,1, . . . PF−1}, and PF represents the adjustment factor.

Optionally, the Ns pieces of first sub-information correspond to the consecutive OFDM symbols in a one-to-one manner. First consecutive RBs on each OFDM symbol include PF positions, and one of possible values of the first sub-information corresponding to each OFDM symbol corresponds to one of the PF positions. When the value of the first sub-information corresponding to each OFDM symbol is Y, the first sub-information corresponding to each OFDM symbol represents that the position of the second consecutive RBs in the first consecutive RBs on each OFDM symbol is Y+1.

Optionally, when a number of consecutive OFDM symbols occupied by the SRS is greater than 1, in response to determining to start frequency hopping based on the frequency-domain related parameter and determining that frequency-domain positions of the SRS on the first consecutive RBs corresponding respectively to the consecutive OFDM symbols are not identical based on the position information, the position information includes Ns/R pieces of second sub-information, where Ns represents the number of consecutive OFDM symbols occupied by the SRS, R represents that every R OFDM symbols are subjected to one frequency hopping, and each piece of the second sub-information has a value being any one in a set {0,1, . . . PF−1}, and PF represents the adjustment factor.

Optionally, the Ns/R pieces of second sub-information correspond to Ns/R groups of OFDM symbols in the consecutive OFDM symbols in a one-to-one manner. First consecutive RBs on each OFDM symbol include PF positions, and one of possible values of the second sub-information corresponding to each OFDM symbol corresponds to one of the PF positions. In response to that the value of the second sub-information corresponding to each OFDM symbol is Y, the second sub-information corresponding to each OFDM symbol represents that the position of the second consecutive RBs in the first consecutive RBs on each OFDM symbol is Y+1.

Optionally, when a number of consecutive OFDM symbols occupied by the SRS is greater than 1, in response to determining to start frequency hopping based on the frequency-domain related parameter and determining that frequency-domain positions of the SRS on the first consecutive RBs corresponding respectively to the consecutive OFDM symbols are not identical based on the position information, at least one of the position information, an index of a number of times of the frequency hopping, and the adjustment factor is used for determining the position of the second consecutive RBs in the first consecutive RBs on each OFDM symbol.

Optionally, the indexes of the number of times of the frequency hopping correspond to the consecutive OFDM symbols in a one-to-one manner.

Optionally, the index of the number of times of the frequency hopping ranges in value from 0 to Ns/R−1, where Ns represents the number of consecutive OFDM symbols occupied by the SRS, and R represents that every R OFDM symbols are subjected to one frequency hopping.

Optionally, the adjustment factor and the position information are obtained when the frequency hopping is started; or the adjustment factor and the position information do not work when the frequency hopping is not started.

Optionally, the adjustment factor and the position information are jointly encoded or independently encoded.

Optionally, the adjustment factor is configured based on each SRS resource or all SRS resources in each SRS set.

Optionally, the position information is configured based on each SRS resource or all SRS resources in each SRS set.

Optionally, a sequence length of the SRS adjusted by the adjustment factor needs to be greater than or equal to a predetermined length.

Optionally, the predetermined length is 12 or a minimum length specified by a protocol.

Optionally, the adjustment factor is determined by a protocol, or is configured by high layer signaling.

Optionally, the communication unit 1310 is further configured to transmit the update instruction to the terminal device. The update instruction is configured to update the adjustment factor.

Optionally, the update instruction is MAC CE signaling or DCI.

Optionally, the configuration information further includes: a starting OFDM symbol and a number of occupied consecutive OFDM symbols. The starting OFDM symbol and the number of consecutive OFDM symbols are used to determine the consecutive OFDM symbols.

Optionally, in some embodiments, the communication unit may be a communication interface or a transceiver, or an input/output interface of a communication chip or a system-on-chip.

It should be understood that the network device 1300 according to the embodiments of the present disclosure may correspond to the network device in the method embodiments of the present disclosure, and the above and other operations and/or functions of each unit in the network device 1300 are respectively intended to implement corresponding procedures of the network device in the method embodiments described above. For brevity, details thereof will be omitted herein.

FIG. 14 is a schematic block diagram of a communication device 1400 according to an embodiment of the present disclosure. The communication device 1400 shown in FIG. 14 includes a processor 1410. The processor 1410 is configured to invoke and run a computer program from a memory to perform the method according to any of the embodiments of the present disclosure.

Optionally, as illustrated in FIG. 14, the communication device 1400 may further include a memory 1420. The processor 1410 may invoke and run a computer program from the memory 1420 to perform the method according to any of the embodiments of the present disclosure.

Here, the memory 1420 may be a separate component independent of the processor 1410, or may be integrated in the processor 1410.

Optionally, as illustrated in FIG. 14, the communication device 1400 may further include a transceiver 1430. The processor 1410 may control the transceiver 1430 to communicate with other devices, specifically, to transmit information or data to other devices, or receive information or data transmitted by other devices.

Here, the transceiver 1430 may include a transmitter and a receiver. The transceiver 1430 may further include one or more antennas.

Optionally, the communication device 1400 may specifically be a network device according to an embodiment of the present disclosure. The communication device 1400 may execute corresponding processes implemented by the network device in the method according to any of the embodiments of the present disclosure. For brevity, details thereof will be omitted herein.

Optionally, the communication device 1400 may specifically be the terminal device according to any of the embodiments of the present disclosure. The communication device 1400 may implement corresponding processes implemented by the terminal device in the method according to any of the embodiments of the present disclosure. For brevity, details thereof will be omitted herein.

Figure 15:
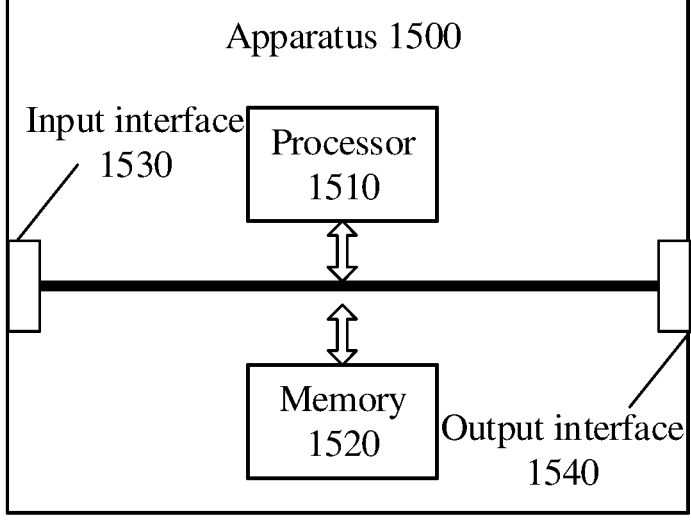
FIG. 15 is a schematic block diagram of an apparatus according to an embodiment of the present disclosure.

FIG. 15 is a schematic diagram showing a structure of an apparatus according to an embodiment of the present disclosure. An apparatus 1500 illustrated in FIG. 15 includes a processor 1510. The processor 1510 can invoke and run a computer program from a memory to perform the method according to any of the embodiments of the present disclosure.

Optionally, as illustrated in FIG. 15, the apparatus 1500 may further include a memory 1520. The processor 1510 may invoke and run a computer program from the memory 1520 to perform the method according to any of the embodiments of the present disclosure.

Here, the memory 1520 may be a separate component independent of the processor 1510, or may be integrated in the processor 1510.

Optionally, the apparatus 1500 may further include an input interface 1530. The processor 1510 can control the input interface 1530 to communicate with other devices or chips, specifically, to obtain information or data transmitted by other devices or chips.

Optionally, the apparatus 1500 may further include an output interface 1540. The processor 1510 can control the output interface 1540 to communicate with other devices or chips, specifically, to output information or data to other devices or chips.

Optionally, the apparatus can be applied to the network device according to any of the embodiments of the present disclosure. In addition, the apparatus can implement corresponding processes implemented by the network device in the method according to any of the embodiments of the present disclosure. For brevity, details thereof will be omitted herein.

Optionally, the apparatus can be applied to the terminal device according to any of the embodiments of the present disclosure. The apparatus can implement corresponding processes implemented by the terminal device in the method according to any of the embodiments of the present disclosure. For brevity, details thereof will be omitted herein.

Optionally, the apparatus mentioned in the embodiments of the present disclosure may be a chip. For example, the chip may be a system-level chip, a system-chip, a chip system, or a system-on-chip.

Figure 16:
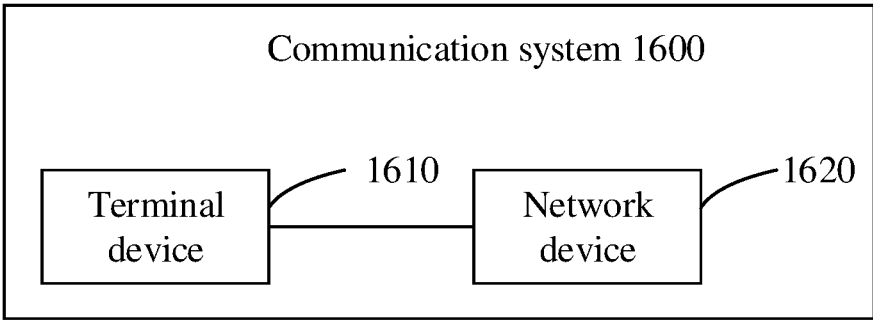
FIG. 16 is a schematic block diagram of a communication system 1600 according to an embodiment of the present disclosure.

FIG. 16 is a schematic block diagram of a communication system 1600 according to an embodiment of the present disclosure. As illustrated in FIG. 16, the communication system 1600 includes a terminal device 1610 and a network device 1620.

Here, the terminal device 1610 can be configured to implement the corresponding functions implemented by the terminal device in the above methods. The network device 1620 can be configured to implement corresponding functions implemented by the network device or the base station in the above methods. For brevity, details thereof will be omitted herein.

It should be understood that the processor in the embodiment of the present disclosure may be an integrated circuit chip with signal processing capability. In an implementation, the steps of the above method embodiments can be implemented by hardware integrated logic circuits in a processor or instructions in the form of software. The above processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or the processor and may be any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as a Random Access Memory (RAM), a flash memory, a Read-Only Memory (ROM), a Programmable ROM, an electrically erasable programmable memory, or a register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be an ROM, a Programmable ROM (PROM), an Erasable PROM (EPROM), an Electrically EPROM (EEPROM), or a flash memory. The transitory memory may be an RAM, which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device or the base station in the embodiment of the present disclosure, and the computer program can cause a computer to perform corresponding procedures implemented by the network device or the base station in the method according to any of the embodiments of the present disclosure. For brevity, description thereof is omitted herein.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. For brevity, description thereof is omitted herein.

An embodiment of the present disclosure also provides a computer program product including computer program instructions.

Optionally, the computer program product can be applied to the network device or the base station in the embodiment of the present disclosure, and the computer program instructions can cause a computer to perform corresponding procedures implemented by the network device or the base station in the method according to any of the embodiments of the present disclosure. For brevity, details thereof will be omitted here.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. For brevity, details thereof will be omitted here.

An embodiment of the present disclosure also provides a computer program.

Optionally, the computer program can be applied to the network device or the base station in the embodiment of the present disclosure. The computer program, when executed on a computer, can cause the computer to perform corresponding procedures implemented by the network device or the base station in each method according to the embodiments of the present disclosure. For brevity, details thereof will be omitted here.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. For brevity, details thereof will be omitted here.

It can be appreciated by those skilled in the art that units and algorithm steps in the examples described in connection to the embodiments disclosed herein can be implemented in an electronic hardware or any combination of a computer software and an electronic hardware. Whether these functions are executed by a hardware or a software depends on specific applications and design constraint conditions of the technical solutions. Those skilled in the art may use different methods for each specific application to implement the described functions, and such implementation is to be encompassed by the scope of the present disclosure.

Those skilled in the art can clearly understand that, for the convenience and conciseness of the description, for the specific operation processes of the systems, apparatuses, and units described above, reference can be made to the corresponding processes in the above method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between apparatuses or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method, comprising:
   determining, by a terminal device based on a frequency-domain related parameter and a first correspondence, an initial number of resource blocks (RBs) for transmitting a sounding reference signal (SRS) on each orthogonal frequency division multiplexing (OFDM) symbol in consecutive OFDM symbols, the first correspondence being a correspondence between frequency-domain related parameters and initial numbers of RBs;
   determining, by the terminal device based on the initial number of RBs and the frequency-domain related parameter, first consecutive RBs for transmitting the SRS; and
   adjusting, by the terminal device based on an adjustment factor, the initial number of RBs to obtain an actual number of RBs smaller than the initial number of RBs, and determining, by the terminal device based on position information, a position of second consecutive RBs for transmitting the SRS in the first consecutive RBs on each OFDM symbol, a number of RBs comprised in the second consecutive RBs being the actual number of RBs;

wherein the adjustment factor is greater than 1, and when a number of consecutive OFDM symbols occupied by the SRS is greater than 1, in response to determining to start frequency hopping based on the frequency-domain related parameter and determining that the SRS has an identical frequency domain position on the first consecutive RBs corresponding respectively to each OFDM symbol of the consecutive OFDM symbols based on the position information, the position information has a value being any one in a set {0,1, . . . PF–1}, wherein PF represents the adjustment factor.

2. The method according to claim 1, wherein the adjustment factor is any one of elements in any one of sets: {2,3,4,8}, {2,4,8}, {2,4}, or {2}.

3. The method according to claim 1, wherein when the number of consecutive OFDM symbols occupied by the SRS is equal to 1, the position information has a value being any one in a set {0,1, . . . PF–1}, wherein PF represents the adjustment factor.

4. The method according to claim 1, wherein the adjustment factor and the position information are jointly encoded or independently encoded.

5. The method according to claim 1, wherein the adjustment factor is configured based on each SRS resource or all SRS resources in each SRS set.

6. The method according to claim 1, wherein the position information is configured based on each SRS resource or all SRS resources in each SRS set.

7. A terminal device, comprising a processor and a memory, wherein the memory has a computer program stored thereon, and the processor is configured to invoke and execute the computer program stored in the memory to enable the terminal device to perform:

determining, based on a frequency-domain related parameter and a first correspondence, an initial number of resource blocks (RBs) for transmitting a sounding reference signal (SRS) on each orthogonal frequency division multiplexing (OFDM) symbol in consecutive OFDM symbols, the first correspondence being a correspondence between frequency-domain related parameters and initial numbers of RBs;

determining, based on the initial number of RBs and the frequency-domain related parameter, first consecutive RBs for transmitting the SRS; and adjusting, based on an adjustment factor, the initial number of RBs to obtain an actual number of RBs smaller than the initial number of RBs, and determining, based on position information, a position of second consecutive RBs for transmitting the SRS in the first consecutive RBs on each OFDM symbol, a number of RBs comprised in the second consecutive RBs being the actual number of RBs;

wherein the adjustment factor is greater than 1, and when a number of consecutive OFDM symbols occupied by the SRS is greater than 1, in response to determining to start frequency hopping based on the frequency-domain related parameter and determining that the SRS has an identical frequency domain position on the first consecutive RBs corresponding respectively to each OFDM symbol of the consecutive OFDM symbols based on the position information, the position information has a value being any one in a set {0,1. . . PF–1}, wherein PF represents the adjustment factor.

8. The terminal device according to claim 7, wherein the adjustment factor is any one of elements in any one of sets: {2,3,4,8}, {2,4,8}, {2,4}, or {2}.

9. The terminal device according to claim 8, wherein when the number of consecutive OFDM symbols occupied by the SRS is equal to 1, the position information has a value being any one in a set {0,1, . . . PF–1}, wherein PF represents the adjustment factor.

10. The terminal device according to claim 7, wherein the adjustment factor and the position information are jointly encoded or independently encoded.

11. A network device, comprising a processor and a memory, wherein the memory has a computer program stored thereon, and the processor is configured to invoke and execute the computer program stored in the memory to enable the network device to perform:

transmitting configuration information of an SRS to a terminal device, the configuration information comprising a frequency-domain related parameter, an adjustment factor, and position information, wherein the frequency-domain related parameter is used to determine an initial number of RBs for transmitting the SRS on each OFDM symbol in consecutive OFDM symbols, the initial number of RBs and the frequency-domain related parameter are used to determine first consecutive RBs for transmitting the SRS, the adjustment factor is used to adjust the initial number of RBs to obtain an actual number of RBs smaller than the initial number of RBs, the position information indicates a position of second consecutive RBs in the first consecutive RBs on each OFDM symbols, and a number of RBs comprised in the second consecutive RBs is the actual number of RBs;

wherein the adjustment factor is greater than 1, and when a number of consecutive OFDM symbols occupied by the SRS is greater than 1, in response to determining to start frequency hopping based on the frequency-domain related parameter and determining that the SRS has an identical frequency domain position on the first consecutive RBs corresponding respectively to each OFDM symbol of the consecutive OFDM symbols based on the position information, the position information has a value being any one in a set {0,1, . . . PF–1}, wherein PF represents the adjustment factor.

12. The network device according to claim 11, wherein the adjustment factor is any one of elements in any one of sets: {2,3,4,8}, {2,4,8}, {2,4}, or {2}.

13. The network device according to claim 11, wherein when the number of consecutive OFDM symbols occupied by the SRS is equal to 1, the position information has a value being any one in a set {0,1, . . . PF–1}, wherein PF represents the adjustment factor.

14. The network device according to claim 11, wherein the adjustment factor and the position information are jointly encoded or independently encoded.

15. The network device according to claim 11, wherein the adjustment factor is configured based on each SRS resource or all SRS resources in each SRS set.

16. The network device according to claim 11, wherein the position information is configured based on each SRS resource or all SRS resources in each SRS set.

* * * * *